(12) United States Patent
Lemaire et al.

(10) Patent No.: US 8,133,095 B2
(45) Date of Patent: Mar. 13, 2012

(54) METHOD OF SHAPING AN OPHTHALMIC LENS

(75) Inventors: Cedric Lemaire, Charenton-le-Pont (FR); Ahmed Haddadi, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 540 days.

(21) Appl. No.: 12/444,997

(22) PCT Filed: Sep. 24, 2007

(86) PCT No.: PCT/FR2007/001553
§ 371 (c)(1),
(2), (4) Date: Apr. 9, 2009

(87) PCT Pub. No.: WO2008/046975
PCT Pub. Date: Apr. 24, 2008

(65) Prior Publication Data
US 2010/0112908 A1    May 6, 2010

(30) Foreign Application Priority Data

Oct. 13, 2006   (FR) ...................................... 06 08987

(51) Int. Cl.
*B24B 1/00* (2006.01)
(52) U.S. Cl. ................... 451/43; 451/5; 451/57
(58) Field of Classification Search ............... 451/5, 6, 451/8–11, 42–44, 57
See application file for complete search history.

(56) References Cited

U.S. PATENT DOCUMENTS

| 4,612,736 | A  | * | 9/1986  | Massard et al. | ............... | 451/5   |
| 5,881,467 | A  | * | 3/1999  | Clara et al.   | ............... | 33/200  |
| 6,328,630 | B1 | * | 12/2001 | Jinbo et al.   | ............... | 451/11  |
| 7,500,316 | B2 | * | 3/2009  | Haddadi        | ............... | 33/200  |
| 7,571,545 | B2 | * | 8/2009  | Nauche et al.  | ............... | 33/200  |

FOREIGN PATENT DOCUMENTS

| EP | 0583915 | 2/1994  |
| EP | 0819967 | 1/1998  |
| FR | 2870933 | 12/2005 |

OTHER PUBLICATIONS

International Search Report dated Apr. 1, 2008, in PCT application.

* cited by examiner

*Primary Examiner* — Dung Van Nguyen
(74) *Attorney, Agent, or Firm* — Young & Thompson

(57) ABSTRACT

A method of shaping an ophthalmic lens includes machining the edge face of the lens by at least one rotary tool having an axis of rotation movable relative to the lens axis, both in rotation and radial and axial translation. These movements are controlled so that the edge face of the lens presents a profiled shape with an engagement ridge suitable for engaging in a bezel of eyeglasses and first and second margins. Given first and second longitudinal curves of the first and second margins, respectively, the edge face of the lens is machined in such a manner that, at each axial section of the lens, the traces in the axial section of the first and second longitudinal curves present first and second distances from the axis of the lens, with the difference (rs) therebetween being a function of the position of the plane of the axial section under consideration.

26 Claims, 11 Drawing Sheets

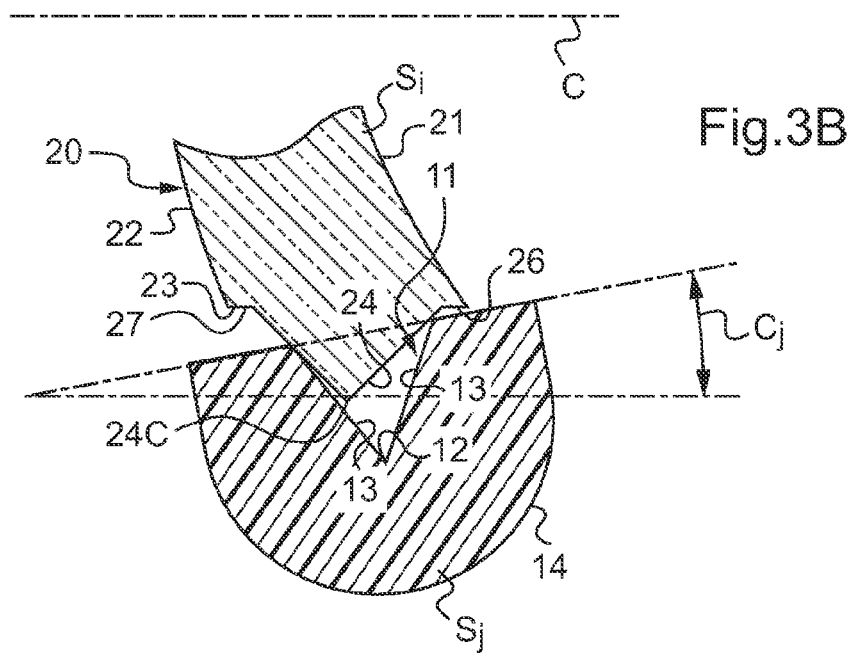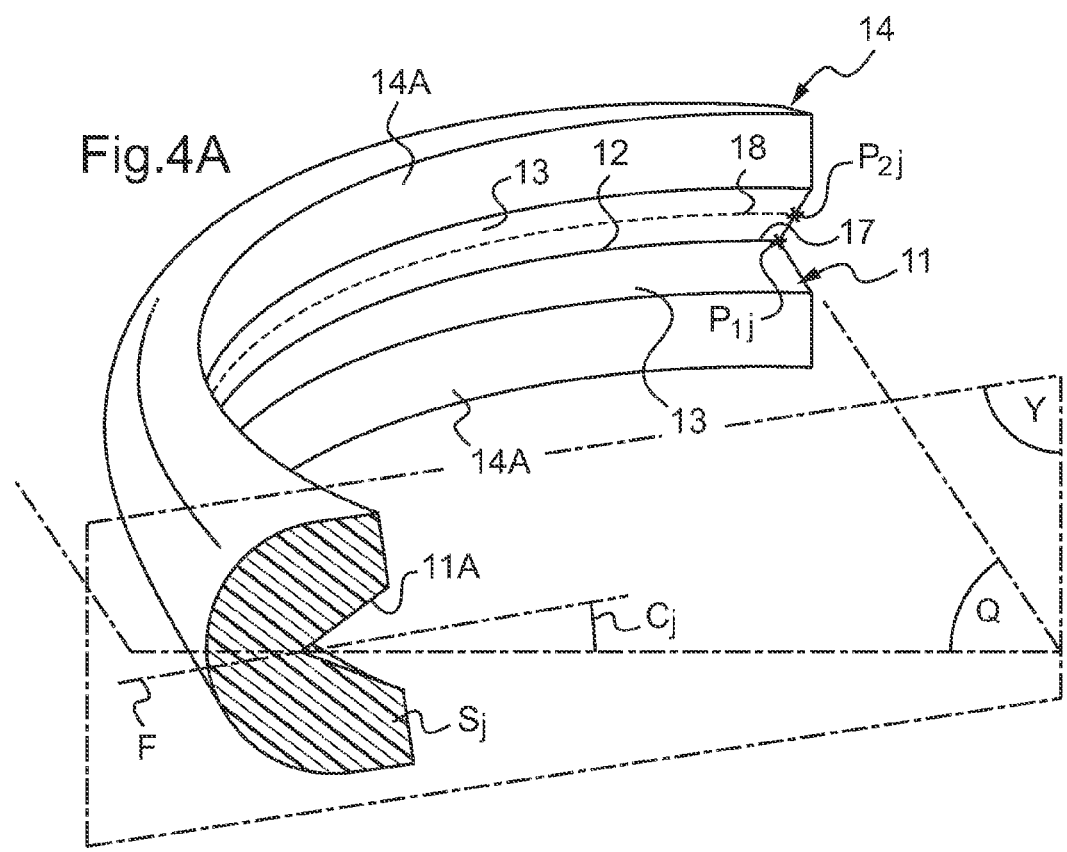

METHOD OF SHAPING AN OPHTHALMIC LENS

TECHNICAL FIELD TO WHICH THE INVENTION RELATES

The present invention relates in general to the field of eyeglasses and more particularly it relates to acquiring the shape of the bezel of a rim of an eyeglass frame and to machining the lens that is to be engaged in the rim.

More particularly, the invention relates to a method of shaping an ophthalmic lens, the method comprising machining the edge face of the lens by means of at least one rotary tool having an axis, the axes of the tool and of the lens being movable relative to each other in rotation about a blocking axis and in translation, both radially and axially, these freedoms of movement being controlled so that the edge face of the lens presents a generally profiled shape that includes an engagement ridge suitable for engaging in a bezel of a rim of an eyeglass frame, and first and second margins on either side of the engagement ridge.

TECHNOLOGICAL BACKGROUND

The technical portion of the profession of an optician consists in mounting a pair of ophthalmic lenses in a frame selected by a wearer. Such mounting comprises three main operations:

acquiring the shape of the bezel of each of the two rims of the eyeglass frame selected by the future wearer, i.e. acquiring the shape of the grooves that run around the insides of the rims of the frame;

centering each lens, which consists in determining the position that the lens is to occupy on the frame in order to be appropriately centered in front of the pupil of the wearer's eye so as to perform properly the optical function for which it is intended; and shaping each lens, which consists in machining or cutting its outline to the desired shape, given the shape of the bezel and the defined centering parameters, and then beveling at the end of such machining, which beveling consists in making an engagement ridge on the edge face of the lens for the purpose of holding the lens in the bezel of the frame.

In the context of the present invention, attention is given mainly to the first operation of acquiring the shapes of the bezels in the rims of the selected eyeglass frame, and to the third operation of machining the edge face of the lens.

In practice, the optician begins by feeling the bottoms of the grooves in the two rims of the selected eyeglass frame so as to determine accurately the coordinates of a plurality of points that characterize the shape of a longitudinal curve traced by the bezel of each rim. Knowing the shape of this curve enables the optician to deduce the approximate shape that needs to be presented by the outline of the lens that is to be machined so as to enable it to be inserted in the corresponding rim of the frame.

In order to improve the accuracy with which the lens is engaged in the corresponding rim of the frame, and as explained in patent EP 0 819 967 in the name of the Applicant, the optician may perform an additional acquisition operation of feeling the transverse shape of a section of the bezel so as to discover the shape of the engagement between the engagement ridge of the ophthalmic lens and the bezel in the eyeglass frame. Acquiring this shape makes it possible to calculate the engagement depth of the engagement ridge in the bezel, thus making it possible to machine the outlines of each lens with increased accuracy so as take account of the engagement depth.

In the context of lenses that are strongly curved, the Applicant has found that inaccuracy remains when calculating engagement, which inaccuracy gives rise to difficulties when mounting lenses in the frame, and possibly making mounting impossible due to interference between the bevel and the margins of the bezel.

Furthermore, in frames having rims that present zones that are highly skewed, i.e. very twisted, the bezel presents a considerable angle of inclination relative to the edge face of the lens, such that an unsightly gap can appear between the rim of the frame and the edge face of the ophthalmic lens.

OBJECT OF THE INVENTION

In order to improve the accuracy and the appearance of such engagement, the present invention provides a method of acquiring the shape of a bezel as defined in the introduction, wherein, given a first longitudinal curve of the first margin and a second longitudinal curve of the second margin, the edge face of the lens is machined in such a manner that, at each axial section of the lens, the traces in said axial section of the first and second longitudinal curves of the two margins present respective first and second distances from the blocking axis of the lens, with the difference therebetween being a function, referred to as an "altitude difference function", that is not entirely uniform.

A rim of an eyeglass frame generally has an inside face provided in its center with a bezel (a kind of groove hollowed out between two flats all along the internal outline of a rim). The bezel generally presents a V-shaped section giving a bottom edge between two flanks.

Depending on the shape of frame selected by the wearer, the angle of inclination of the bezel and of the flats varies to a greater or lesser extent around the internal outline of each rim. However, in the state of the art, the angle of inclination of the profile of the engagement ridge on the edge face of the lens remains generally constant. This difference in angle of inclination between the bezel and the engagement ridge gives rise to variation in the distance between each margin (on the edge face of the lens) and the corresponding flat (of the rim of the frame).

In particular, when the bezel is very skewed, the distance between one of the margins, the margin beside the convex front face of the lens, and the corresponding flat may become large, thereby creating an unsightly gap between the rim of the frame and the edge face of the ophthalmic lens.

Furthermore, the distance between the other margin and the corresponding flat becomes very small or even zero, thereby giving rise to conflicts between the edge face of the lens and the rim of the frame. This conflict gives rise to difficulties in mounting lenses in the frame.

Consequently, the present invention proposes machining the edge face of the ophthalmic lens in such a manner that, once the lens is engaged in the frame, the distances between the margins of the lens and the flats of the frame remain constantly small all around the internal outline of the rim. Thus, no visible gap and no conflict appears between the rim of the frame and the ophthalmic lens.

In a first implementation of the invention, the engagement ridge is machined in compliance with axial and radial shape setpoints giving, as a function of the position of the plane of the axial section under consideration of the lens, respectively the axial and radial positions of the trace of a directing longitudinal curve of said engagement ridge in said axial section, and said altitude difference function incorporates at least one of the axial and radial setpoints for the shape of the directing longitudinal curve in the axial section under consideration along the edge face of the lens.

According to an advantageous characteristic of the invention, said altitude difference function includes a parameter that is characteristic of the overall shape of one of the optical faces of the ophthalmic lens or of a longitudinal curve of the bezel of the rim of the eyeglass frame.

The skew of the bezel is due to the fact that the eyeglass frame is cambered. The more the frame is cambered, the greater the extent to which the bezel is inclined. Thus, knowing the shape of a longitudinal curve of the bezel in the rim of the eyeglass frame, it is possible to approximate the camber of the frame and thus the skew of the bezel. It is then possible to deduce the altitude difference function.

Furthermore, an ophthalmic lens presents its own camber that is selected as a function of the camber of the corresponding rim of the frame, in such a manner as to enable the lens to be engaged in the rim. Thus, the shape of the lens is generally proportional to the camber of the eyeglass frame. Consequently, knowing the shape of the lens, it is possible to determine the skew of the bezel.

According to another advantageous characteristic of the invention, said parameter characteristic of shape comprises a radius of a spherical base approximating to the shape of the ophthalmic lens, or of a longitudinal curve of the bezel of the rim of the eyeglass frame.

According to another advantageous characteristic of the invention, said altitude difference function includes at least one parameter that is deduced from the radial and axial shape setpoints for the directing longitudinal curve of the engagement ridge.

The directing longitudinal curve of the engagement ridge extends generally on the surface of a sphere. It is possible, solely as a function of the radial and axial coordinates of a plurality of points of the directing longitudinal curve of the engagement ridge, to determine the characteristics of this inscribed sphere. Given the shape of this sphere, it is possible to deduce the skew of the bezel and thus the altitude difference function.

According to another advantageous characteristic of the invention, the shape of the profile of the bezel of the rim is obtained by feeling, with or without making contact, at least one acquired cross-section of the rim, and said altitude difference function includes a parameter depending on the shape of the profile acquired in this way.

In a second implementation of the invention, the method comprises acquiring the shape of a first longitudinal curve of the bezel, acquiring the skew angle of the bezel profile or the shape of the bezel profile at a plurality of acquired cross-sections of the bezel, and shaping the ophthalmic lens, wherein said altitude difference function is deduced from the acquired skew angles or the acquired shapes for the profile of the bezel.

In this embodiment of the invention, reference is made solely to the shape of the bezel in the rim of the eyeglass frame in order to determine its skew or twist (i.e. its orientation) all around the internal outline of the rim, in order to be able to machine the edge face of the lens to comply with the altitude difference function.

According to another advantageous characteristic of the invention, in order to determine the angle of orientation of the profile of the bezel at said plurality of acquired cross-sections of the bezel, the profile of the bezel is felt at least two felt cross-sections of the bezel, the angle of orientation of the profile of the bezel is calculated at each of the felt cross-sections, and by interpolation the angle of orientation of the profile of the bezel is deduced therefrom at each acquired cross-section of said plurality of acquired cross-sections.

Generally, the skew of a bezel of an eyeglass rim is not exactly proportional to the camber of the rim of the frame. In addition, it can happen that the dihedral angle of the bezel varies a little along the internal outline of the rims of the frame. In order to take account of these variations in the shape of the bezel along its outline, the present method proposes feeling a small number of sections of the bezel transversely in order to deduce more accurately the way in which the skew of the bezel varies around the rim of the eyeglass frame.

According to another advantageous characteristic of the invention, the position of a section plane of at least one of the felt cross-sections of the bezel is selected by calculation on the basis of the previously acquired shape of the first longitudinal curve of the bezel, so that the profile of the bezel in said felt cross-section presents a skew angle greater than or less than a predefined threshold value.

Generally, the changes to the shape of the bezel appear in highly cambered zones of the eyeglass rims, i.e. in the temporal zones of the frame; otherwise the profile of the bezel remains substantially identical outside these zones. Thus, the profile of the bezel is felt outside the zones in order to determine the shape that the bezel presents over the major fraction of the rims of the frame. It is also possible to feel the profile of the bezel in these cambered zones in order to determine the shape of the bezel in these zones.

According to another advantageous characteristic of the invention, in order to determine the skew angle of the profile of the bezel at said plurality of acquired cross-sections of the bezel, in addition to acquiring the shape is also acquired of the first longitudinal curve of the bezel, the shape of at least one second longitudinal curve of the bezel, said curve being offset relative to the first longitudinal curve, and the relative positions of the first and second longitudinal curves are determined.

The dihedral angle, the three-dimensional coordinates of the peak of the V-shape, and the coordinates of a point on one of its flanks serve to characterize the V-shape. Thus, knowing the dihedral angle of the bezel and the three-dimensional coordinates of a plurality of points along the first and second curves, it is possible to determine accurately the angle of inclination of the profile of the bezel at a plurality of sections of the internal outline of the rim of the eyeglass frame.

According to another advantageous characteristic of the invention, the shapes of the first and second longitudinal curves are acquired by sliding a feeler along the bezel, each of the first and second longitudinal curves possessing three shape parameters corresponding to three dimensions in space, two of these shape parameters of the second longitudinal curve being determined as a function of the corresponding parameters of the first longitudinal curve, and the third shape parameter being sensed while reading the second longitudinal curve.

It is easy to read the first longitudinal curve since merely pressing the feeler towards the bezel causes it to slide along the flanks of the bezel and to reach the bottom edge. Pressing constantly while taking readings of the entire first longitudinal curve thus makes to possible to ensure that the feeler remains at the bottom of the bezel. It is not very easy to read the second longitudinal curve. This requires the feeler to be held against one of the flanks of the bezel, without sliding towards the bottom edge and without escaping from the bezel. For this purpose, the method proposes controlling the feeler as a function of two parameters of the bottom edge of the bezel in order to ensure that the feeler slides on one of the flanks of the bezel.

According to another advantageous characteristic of the invention, in addition to acquiring the shape of the first longitudinal curve and the shape of the second longitudinal curve, the shape of a third longitudinal curve of the bezel is also acquired, and the skew angle of the profile of the bezel is deduced at each section of the plurality of acquired cross-sections of the bezel as a function solely of the relative positions of the traces of the first, second, and third longitudinal curves in said section.

The three-dimensional coordinates of the peak of a V-shape and the coordinates of a point disposed on each of its flanks enables the V-shape to be characterized. This variant implementation of the invention thus proposes feeling three longitudinal curves of the bezel in order to determine the skew of the bezel without making use of the dihedral angle of the bezel when calculating the skew.

According to another advantageous characteristic of the invention, the engagement ridge is machined in compliance with a shaping axial setpoint that is calculated by simulating the engagement of the engagement ridge in the bezel of the eyeglass frame as a function of the skew angle of the profile of the bezel or as a function of the shape of the profile of the bezel at each section of the plurality of acquired cross-sections of the bezel.

The skew of the bezel causes the axial position of the bottom of the bezel to vary towards the front face or towards the rear face of the rim of the eyeglass frame. Thus, the method of the invention proposes taking account of the variation in the skew of the bezel when calculating engagement for the purpose of machining an engagement ridge on the edge face of the lens that is itself at a varying distance from the front face of the lens.

According to another advantageous characteristic of the invention, the edge face of the lens is machined in such a manner that the orientation of the profile of the edge face of the ophthalmic lens relative to the blocking axis of the lens varies along the edge face of the lens in accordance with said altitude difference function.

According to another advantageous characteristic of the invention, the machining of the edge face of the ophthalmic lens is performed by means of a grindwheel that presents a groove for machining the engagement ridge, together with two faces on either side of said groove for the purpose of machining the margins, and that, during machining, rotates about an axis of rotation that can be oriented relative to the blocking axis of the ophthalmic lens, and the variation in the orientation of the profile of the edge face of the ophthalmic lens is obtained by controlling the orientation of the axis of rotation of the grindwheel relative to the blocking axis of the ophthalmic lens while machining of the edge face of the lens.

Thus, in order to cause the distances between each of the margins and the optical axis of the lens to vary, the method proposes varying the angle of inclination of the engagement ridge and of the margins along the edge face of the lens. In particular, this angle of inclination can be calculated as a function of the skew of the bezel (deduced from the shape of the longitudinal curve), so that at all points on the rim, the margins of the edge face of the lens are inclined in the same manner as the flats of the internal face of the rim.

According to another advantageous characteristic of the invention, the edge face of the lens is machined in such a manner that, at each axial section of the lens, the profiles of the two margins extend generally along straight lines that are substantially parallel to the blocking axis of the ophthalmic lens.

According to another advantageous characteristic of the invention, the engagement ridge presents a peak and two sloping flanks on either side of the peak, the edge face of the ophthalmic lens is machined by means of a wheel having two working zones, each shaped to machine simultaneously one of the sloping flanks of the engagement ridge and the adjacent margin of the edge face of the ophthalmic lens, and the position of the wheel is controlled so that each of its working zones machines successively and asymmetrically one of the sloping flanks of the engagement ridge and the adjacent margin, and then the other sloping flanks of the engagement ridge and the adjacent margin.

Thus, in order to vary the radial distances between each of the margins and the optical axis of the lens, the method proposes machining each margin of the edge face of the lens to a greater or lesser depth.

DETAILED DESCRIPTION OF AN IMPLEMENTATION

The following description with reference to the accompanying drawings, given as non-limiting examples, makes it clear what the invention consists in and how it can be reduced to practice.

In the accompanying drawings:

FIGS. 3A and 3B are fragmentary axial section views of an ophthalmic lens engaged in the bezel of one of the FIG. 1 eyeglass frame rims, at two distinct points around its outline;

FIG. 4A is a diagrammatic perspective view of a portion of one of the FIG. 1 eyeglass frame rims;

In order to implement the method of the invention, it is possible to use a shape reader appliance. The shape reader appliance constitutes means well known to the person skilled in the art and does not itself constitute the subject matter of the invention described. By way of example, it is possible to use a shape reader appliance such as that described in patent EP 0 750 172 or sold by Essilor under the trademark Kappa or Kappa CT.

Figure 1:
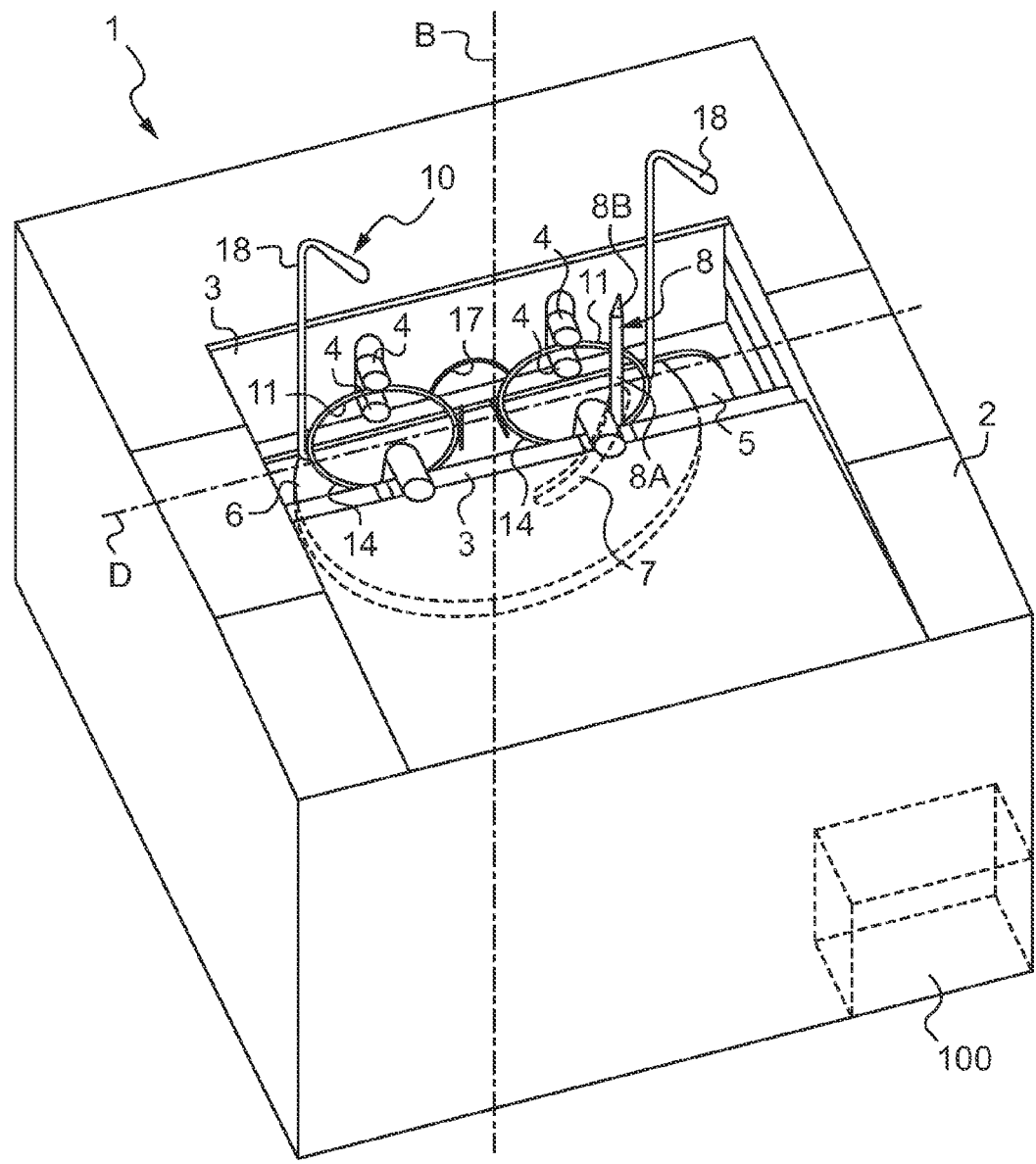
FIG. 1 is an overall perspective view of a shape reader appliance having a rimmed eyeglass frame placed therein.

FIG. 1 is an overall view of the shaper reader appliance 1 as seen by its user. The appliance comprises a top cover 2 covering the entire appliance with the exception of a central top portion in which an eyeglass frame 10 is placed.

The shape reader appliance 1 is for reading the shape of the internal outlines of the eyeglass frame 10.

Figure 3A:
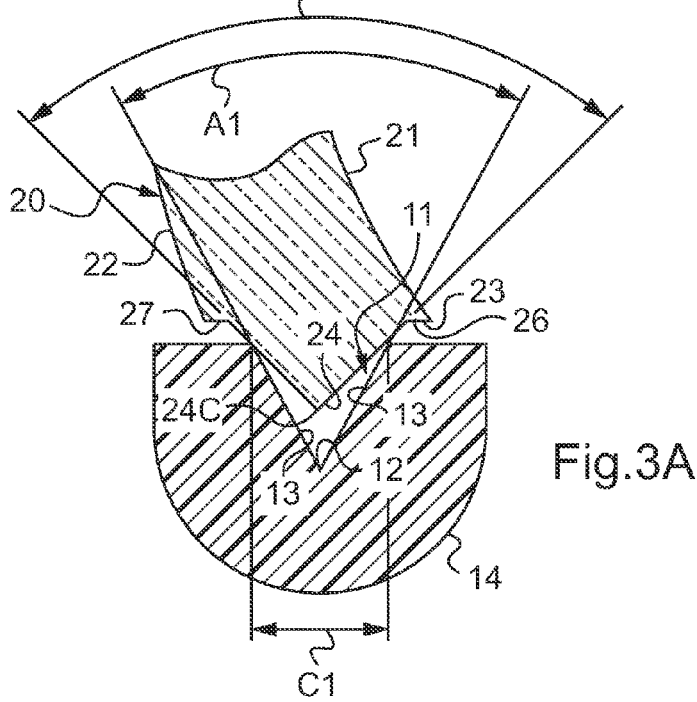

The eyeglass frame 10 shown is of the rimmed type. In particular, it has two rims 14, each intended to be positioned in register with one of the eyes of the wearer when the wearer is wearing the frame. As shown in FIGS. 3A and 3B, each of the rims 14 of the eyeglass frame 10 is adapted to receive an ophthalmic lens 20.

Figure 2A:
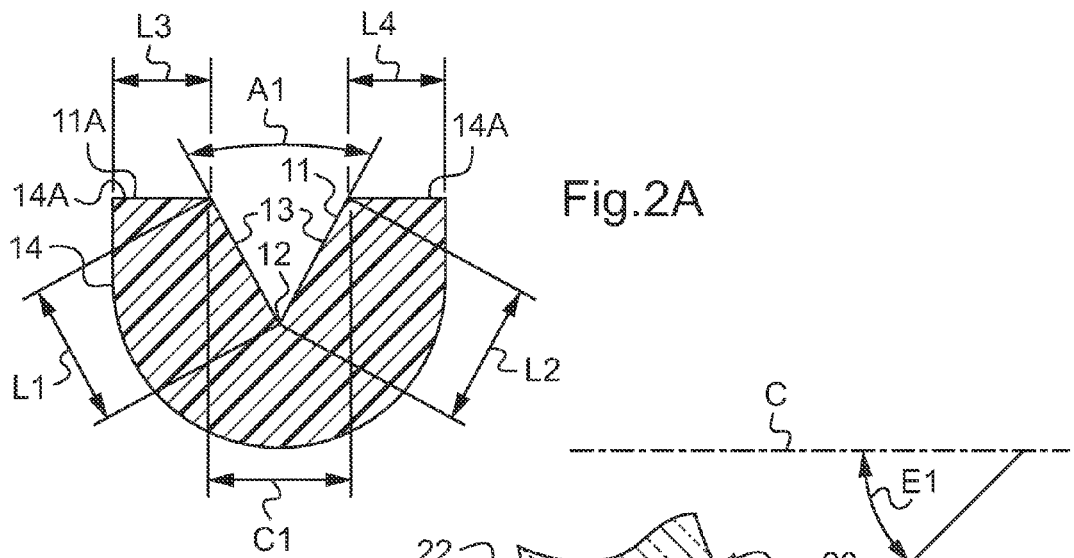
FIG. 2A is a cross-section view of an eyeglass frame rim.
Figure 2B:
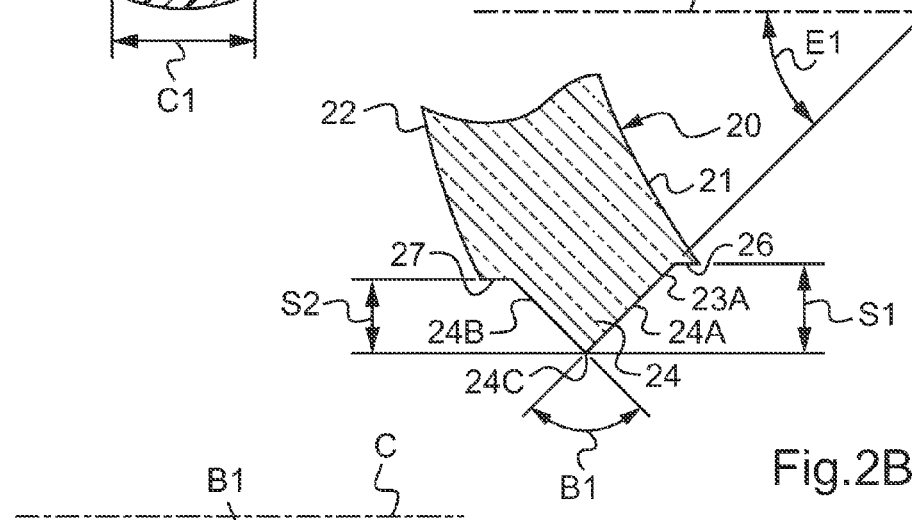
FIG. 2B is a fragmentary axial section view of an ophthalmic lens.
Figure 4B:
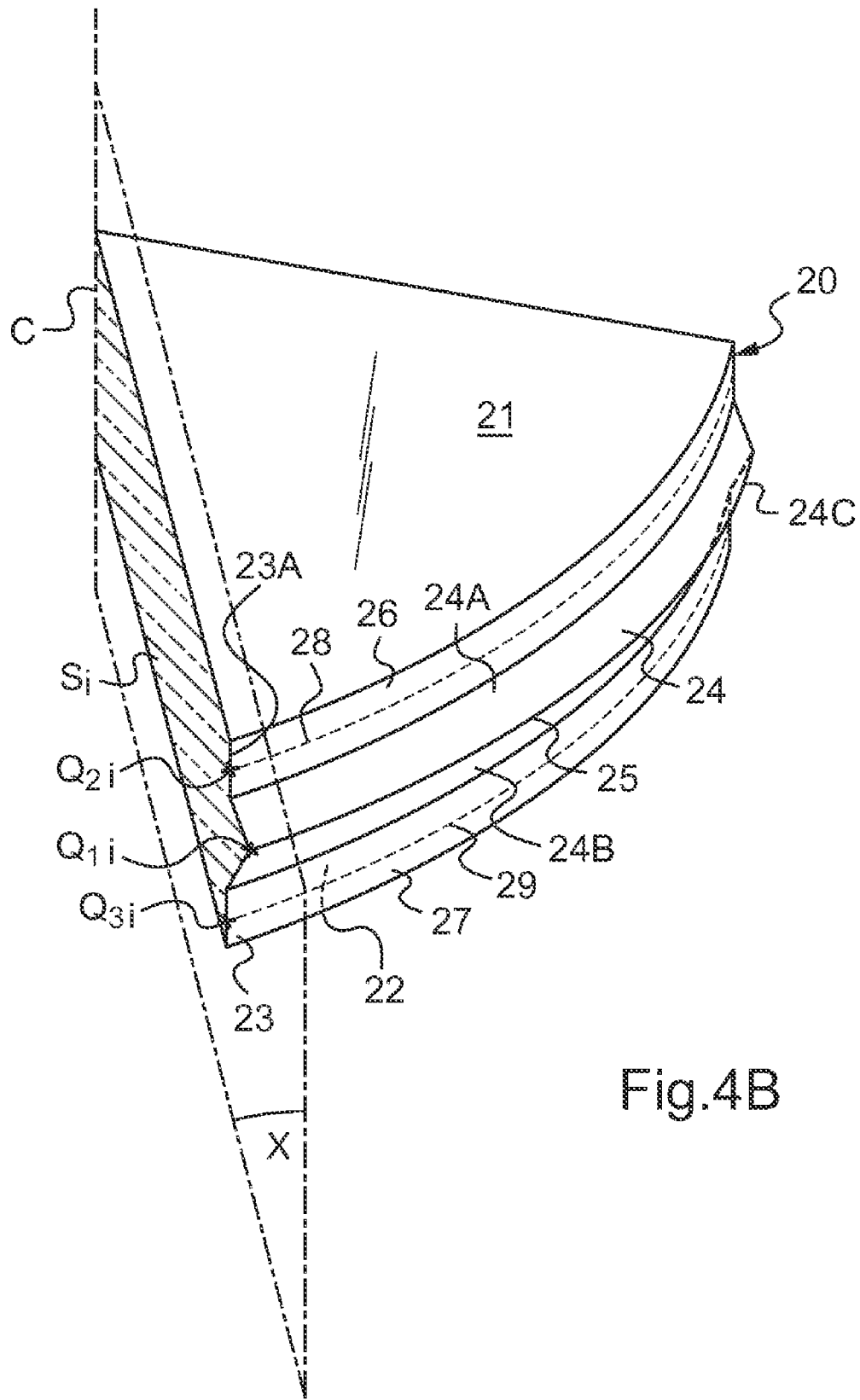
FIG. 4B is a diagrammatic perspective view of the portion of the FIG. 2B ophthalmic lens.

As shown in FIGS. 2B and 4B, the ophthalmic lens 20 presents rear and front optical faces 21 and 22, an edge face 23, and an optical axis C (substantially perpendicular to the plane that is tangential to the center of the front optical face of the lens). The lens needs to be machined so that its edge face 23 presents an engagement ridge 24 (or bevel) of V-shaped section with an angle B1 at its peak. This engagement ridge 24 thus presents a peak 24C in the form of an edge that runs along the edge face 23 of the lens, and on either side of the peak there are rear and front sloping flanks 24A and 24B. The edge face of the lens 20 is also machined so as to present rear and front margins 26 and 27 (also referred to as the flats of the bevel) disposed on either side of the engagement ridge 24.

As shown in FIG. 4B, each axial section Si of the lens is made in a section plane X containing the optical axis C and defining a profile 23A of the edge face 23 of the lens. As shown, this profile comprises two parallel segments corresponding to the traces of the margins 26 and 27 in the section plane X, and two intersecting inclined segments corresponding to the traces of the sloping flanks 24A and 24B of the engagement ridge 24.

On the edge face 23 of the lens, it is possible to define longitudinal curves that run along its outline. Consideration is given in particular to a directing longitudinal curve 25 that coincides with the edge of the peak 24C of the engagement ridge 24. The traces of these longitudinal curves in each axial section Si of the lens form points that belong to the profile 23A of the edge face of the lens. The trace of the directing longitudinal curve 25 in the axial section Si is written $Q_1i$, while the traces of the other longitudinal curves are written $Q_2i, \ldots, Q_k i$.

As shown in FIGS. 2A and 4A, the two rims 14 of the eyeglass frame 10 present an inside face including an internal groove, commonly referred to as a bezel 11 of V-shaped section presenting a dihedral angle A1 and an opening of width C1. On either side of this bezel, the inside face of each rim 14 presents two margins 14A. Each bezel 11 presents a bottom edge 12 between two flanks 13. The dihedral angle A1 is a priori constant, but it might possibly vary along the internal outline of each rim 14. As shown in FIG. 4A, each cross-section Sj of the rim 14 of the frame is taken in a section plane Y corresponding to one of the section planes X of the lens (i.e. these section planes are intended to coincide when the lens is engaged in its eyeglass frame rim). Each cross-section Sj of the rim 14 defines a profile 11A of the bezel 11. As shown, each of these profiles 11A has two parallel segments corresponding to the traces of the margins 14A in this plane, and two inclined and intersecting segments corresponding to the traces of the flanks 13 of the bezel 11.

Consideration may be given to longitudinal curves forming part of the bezel 11 and running along its outline. Consideration is given in particular to a first longitudinal curve 17 that coincides with the bottom edge 12 of the bezel 11. The traces of these longitudinal curves in each cross-section Sj of the rim constitute points forming parts of the profile 11A of the bezel. The trace of the first longitudinal curve 17 in the cross-section Sj is written $P_1j$, while the traces of the other longitudinal curves are written $P_2j, \ldots, P_h j$.

The eyeglass frame 10 is cambered, such that the bezels 11 are skewed, i.e. twisted. Consequently, each section Sj of the bezel 11 has its own angle of inclination. As shown in FIGS. 3B and 4A, this angle of inclination, which varies along the bezel 11, is quantified at each section Sj of the bezel in terms of an angle referred to as the skew angle Cj. The skew angle Cj corresponds to the angle formed between the bisector F of the bezel and the mean plane Q of the rim of the frame (i.e. the plane that presents on average minimum departure from the points constituted by the bottom edge of the bezel). This skew angle is generally zero in the nasal zones of the rims 14 of the frame 10, and at maximum in its temporal zone. The bezel section shown in FIG. 3A corresponds to a section taken in a nasal zone of the rim 14 of the eyeglass frame; the bezel section shown in FIG. 3B corresponds to a section taken in a temporal zone of the rim 14 of the frame.

From FIGS. 3A and 3B, it can be understood that the skew of the bezels 11 has an influence on the way in which the engagement ridge 24 of the ophthalmic lens 20 engages in the rim 14 that is associated therewith. More precisely, the distance between the peak 24C of the engagement ridge 24 of the ophthalmic lens 20 and the bottom edge 12 of the bezel 11 varies as a function of the skew angle Cj. Account therefore needs to be taken of this variation by determining the skew angle Cj at all points on the internal outline of each rim 14 of the eyeglass frame 10. In addition, the space between the rear margin 26 of the edge face 23 of the ophthalmic lens 20 and the corresponding margin 14A of the rim 14 varies as a function of the skew angle Cj. The same applies to the space between the front margin 27 of the edge face 23 of the ophthalmic lens 20 and the corresponding margin 14A of the rim 14. When the value of the skew angle Cj is large, this space can be large beside the front face of the frame and very small beside the rear face. This large space at the front face is unattractive and the lack of space at the rear face can create conflict between the frame and the lens. It is therefore appropriate to modify the relative positions of the margins 26 and 27 of the edge face 23 of the ophthalmic lens 20 so that, in each cross-section Sj of the bezel 11 of the frame, their distances from the rim 14 of the frame remains substantially constant. That is the object of the present invention.

The shape reader appliance 1 shown in FIG. 1 has a set of two jaws 3, with at least one of the jaws 3 being movable relative to the other so that the jaws 3 can be moved towards each other or apart so as to form a clamping device. Each of the jaws 3 is also provided with two clamps, each made up of two movable studs 4 that are suitable for clamping between them the eyeglass frame 10 so as to hold it stationary.

In the space left visible by the top central opening in the cover 2, there can be seen a structure 5. A plate (not shown) is capable of moving in translation on the structure 5 along a transfer axis D. This plate has a turntable 6 mounted to rotate thereon. The turntable 6 is thus suitable for taking up two positions along the transfer axis D, a first position in which the center of the turntable 6 is disposed between the two pairs of studs 4 holding the right rim of the eyeglass frame 10, and a second position in which the center of the turntable 6 is disposed between the two pairs of studs 4 holding the left rim of the eyeglass frame 10.

The turntable 6 has an axis of rotation B defined as the axis normal to the front face of the turntable 6 and passing through its center. It is suitable for pivoting about this axis relative to the plate. The turntable 6 also includes a circularly arcuate oblong slot 7 through which a feeler 8 projects. The feeler 8 comprises a support rod 8A of axis perpendicular to the plane of the front face of the turntable 6, and, at its free end, a feeler finger 8B of axis perpendicular to the axis of the support rod 8A. The feeler finger 8B is designed to follow the bottom edge 12 of each bezel 11 of the eyeglass frame 10 by sliding therealong, or possibly by rolling.

The shape reader appliance 1 includes actuator means (not shown) suitable firstly for causing the support rod 8A to slide along the slot 7 so as to modify its radial position relative to the axis of rotation B of the turntable 6, secondly to vary the angular position of the turntable 6 about it axis of rotation B, and thirdly to position the feeler finger 8B of the feeler 8 at a higher or lower altitude relative to the front face of the turntable 6.

In summary, the feeler 8 is provided with three degrees of freedom, comprising a first degree of freedom R constituted by the ability of the feeler 8 to move radially relative to the axis of rotation B because of its freedom to move along the circular arc formed by the slot 7, a second degree of freedom TETA constituted by the ability of the feeler 8 to pivot about the axis of rotation B by the turntable 6 rotating relative to the plate, and a third degree of freedom Z constituted by the ability of the feeler 8 to move in translation along an axis parallel to the axis of rotation B of the turntable 6.

Each point read by the end of the feeler finger 8B of the feeler 8 is identified in a corresponding coordinate system R, TETA, Z. Each axial section plane X of the lens 20 and each section plane Y or cross-section Sj of the rim 14 is defined by its angular position TETAi, TETAj about the blocking axis C. Two axial section X and cross-section Sj planes are said to correspond when their angular positions TETAi and TETAj are equal.

The shape reader appliance 1 also includes an electronic and/or computer device 100 serving firstly to control the actuator means of the shape reader appliance 1, and secondly to acquire and record the coordinates R, TETA, Z of the end of the feeler finger 8B of the feeler.

In a first implementation of the acquisition method of the invention, and with reference to FIG. 1, prior to starting feeling of the bezel 11 in one of the rims 14 of the eyeglass frame 10, the frame is inserted between the studs 4 of the jaws 3 so that each of its rims 14 is ready to be felt along a path beginning with the feeler 8 being inserted between the two studs 4 that engage the bottom portion of the corresponding rim of the frame, and then following along the bezel 11 of the frame so as to cover the entire circumference of the rim 14 of the eyeglass frame 10.

In the initial position, when the feeler finger 8B is placed between the two studs 4, the electronic and/or computer device 100 defines as being zero the angular position TETA and the altitude Z of the end of the feeler finger 8B of the feeler 8.

In order to acquire the shape of the bezel 11 of each rim 14 of the eyeglass frame 10, the method of the invention has four main steps.

During a first step, the shape of a first longitudinal curve 17 of the bezel 11 of one of the rims 4 is determined. To do this, the actuator means cause the turntable 6 to pivot.

During pivoting of the turntable 6, the actuator means apply a constant radial force biasing the feeler 8 towards the bezel 11, so that the feeler finger 8B of the feeler 8 slides along the bottom edge 12 of the bezel 11 without rising along the flanks 13 of the bezel 11.

Figure 5A:
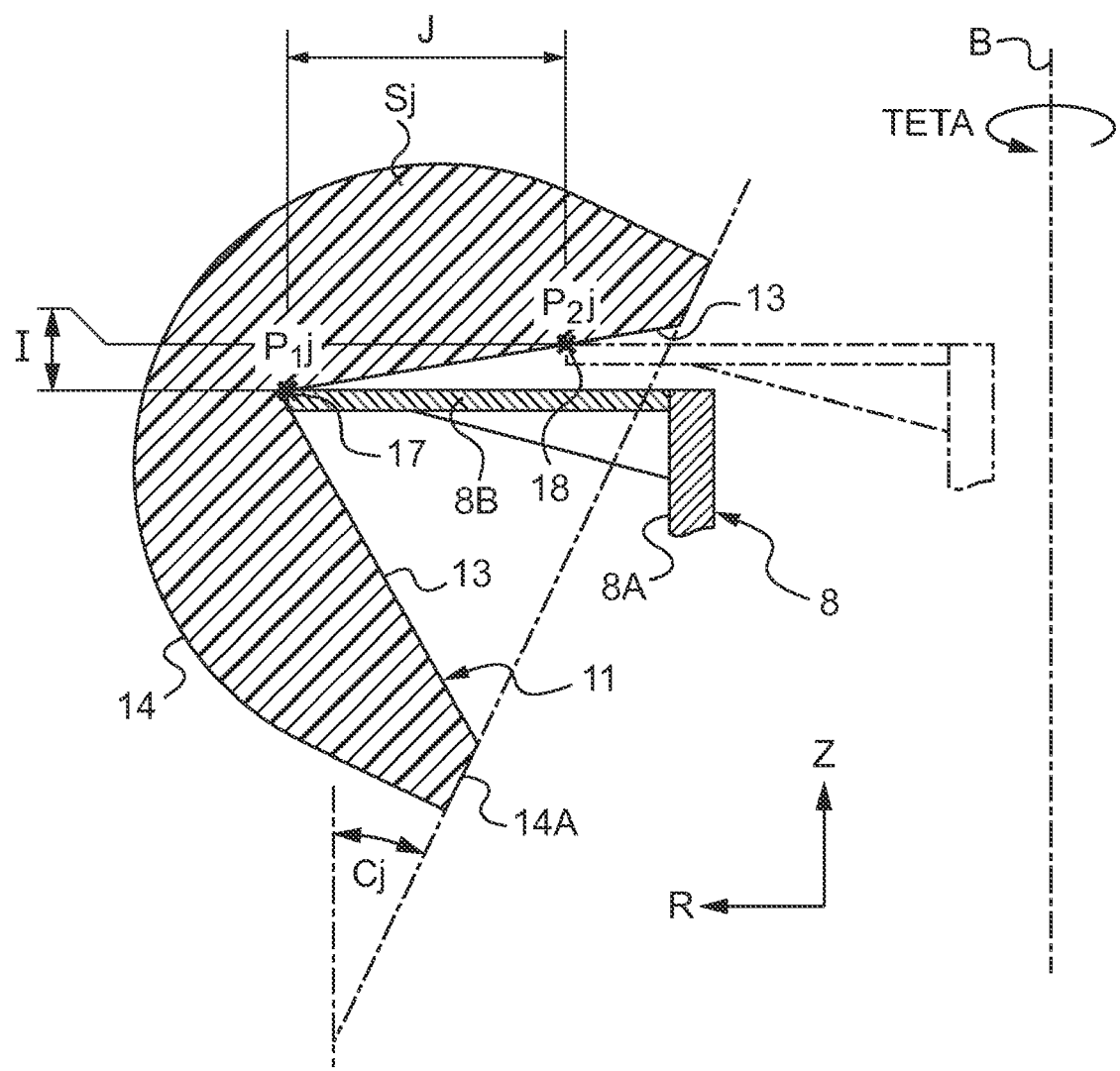
FIGS. 5A and 5B are theoretical diagrams showing how the shape of the bezel of the FIG. 1 eyeglass frame rim is acquired by a feeler in two variants of a first implementation of the invention.

As shown in FIGS. 4A and 5A, during rotation of the turntable 6, the electronic and/or computer device 100 reads the three-dimensional coordinates $R_1j$, $TETAj$, $Z_1j$ of a plurality of points $P_1j$ along the bottom edge 12 of the bezel 11 (e.g. 360 points spaced apart angularly by one degree). Each point $P_1j$ corresponds to the trace of the first longitudinal curve 17 in an identified cross-section Sj of the bezel 11. From the three-dimensional coordinates $R_1j$, $TETAj$, $Z_1j$ of these 360 points, the electronic and/or computer device 100 deduces and stores a numerical image of the outline of the bottom edge 12 of the bezel 11. This outline corresponds to the outline of the first longitudinal curve 17 of the bezel 11 that coincides with the bottom edge 12. After one complete revolution of the turntable 6, the actuator means stop its rotation.

During a second step, the electronic and/or computer device 100 precedes with a step of reading a second longitudinal curve 18 of the bezel that is offset from the first longitudinal curve 17. With the turntable 6 remaining stationary, the electronic and/or computer device 100 controls the actuator means so as to increase the altitude Z of the feeler by a height I, causing the feeler finger 8B to slide along one of the flanks 13 of the bezel 11.

Thereafter, the actuator means cause the turntable 6 to pivot again so that the feeler finger 8B remains constantly above the bottom edge 12 of the bezel 11, being spaced apart therefrom by the height I. For this purpose, the actuator means exert a bias force radially on the feeler 8 towards the bezel 11 so that the bezel and the feeler remain continuously in contact with each other.

The electronic and/or computer device 100 then reads the three-dimensional coordinates $R_2j$, $TETAj$, $Z_2j$ of 360 points $P_2j$ corresponding to a second longitudinal curve 18 of the bezel 11, situated on one of the flanks of the bezel. Each of these 360 points is situated on one of the identified cross-sections Sj of the bezel 11.

It should be observed that the altitude $Z_2j$ of each point $P_2j$ is equal to the sum of the constant I plus the altitude $Z_1j$ of the corresponding point $P_1j$ of the first longitudinal curve 17.

Figure 5B:
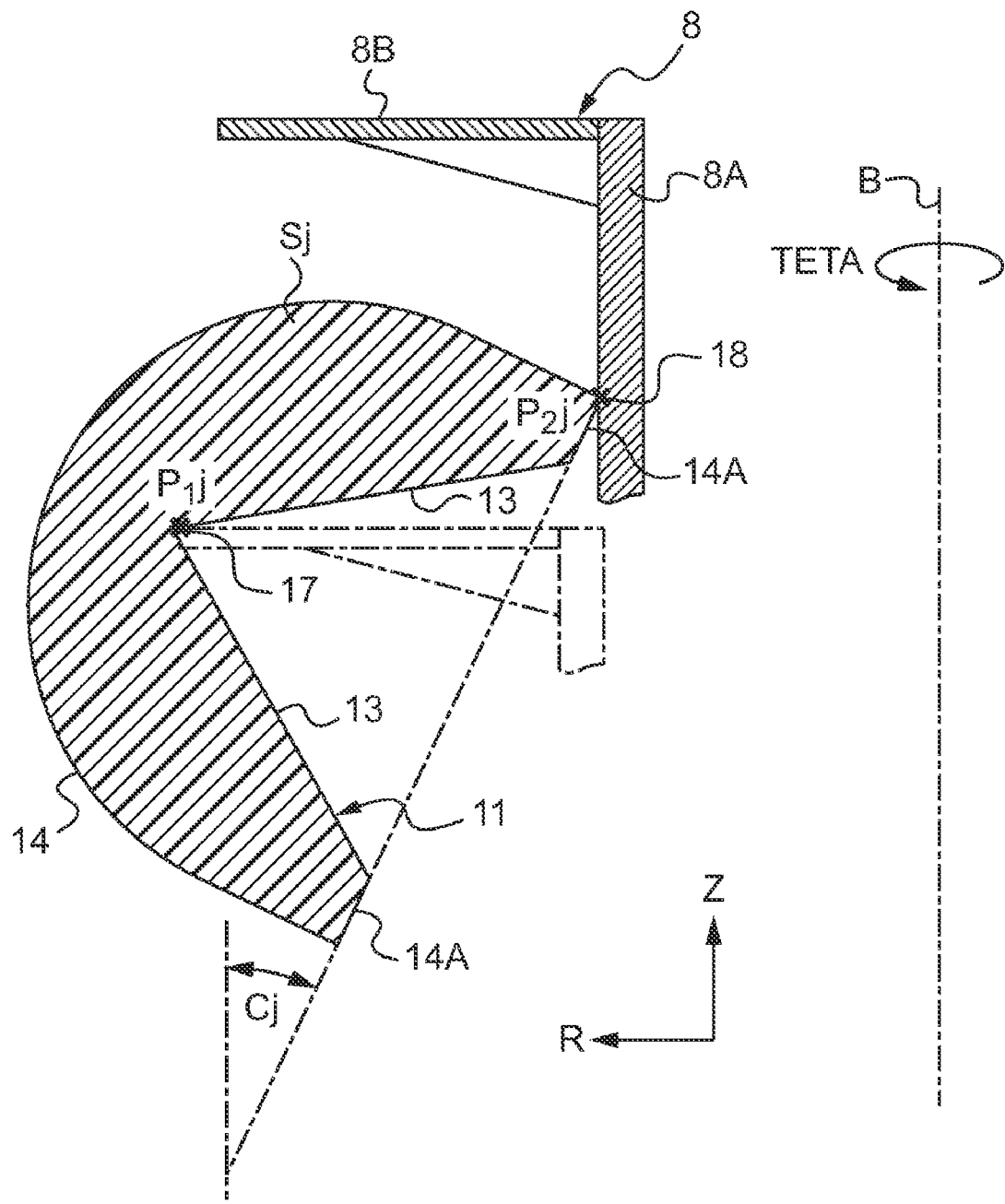

In a variant, and as shown in FIG. 5B, the second longitudinal curve may be read by the support rod 8A of the feeler 8. In this variant, the second longitudinal curve 18 extends along one of the margins 14A of the bezel 11. More precisely, in each cross-section Sj of the bezel 11, the trace $P_2j$ of the second longitudinal curve 18 corresponds to the point of the profile 11A of the bezel 11 having the smallest radial coordinates $R_2j$.

In order to feel this second curve, the actuator means of the feeler place the feeler finger 8B of the feeler 8 at an altitude Z that is greater than the maximum altitude of the rim of the frame so as to avoid any interference between the rim of the frame and the feeler finger. The feeler 8 is then urged radially towards the inside face of the rim 14 so that its support rod 8A comes into contact with the rim. Thereafter, the actuator means cause the turntable 6 to pivot again so as to read the radial positions $R_2j$ of the traces $P_2j$ of the second longitudinal curve 18 in the 360 identified cross-sections Sj of the rim. The altitudes $Z_2j$ of these traces are then deduced from the measured radial positions $R_2j$ and from the shape of the profile of the bezel 11 (which is determined during a third step).

In any event, during a third step, the electronic and/or computer device 100 proceeds with a step of reading an arbitrary profile 11A of a section Sj of the bezel 11. In practice this cross-section Sj that is felt is situated in the proximity of the nasal zone of the rim 14 of the eyeglass frame 10.

To perform this reading step, the turntable 6 is held stationary, with the electronic and/or computer device 100 controlling the actuator means so as to impart a constant radial force on the feeler 8 towards the bezel 11 and so as to modify the altitude Z of the feeler 8 so that it slides over one of the flanks 13 and then over the other flank 13 of the bezel 11, and also over the margins 14A of the rim 14. This feeling of the profile 11A of the bezel 11 makes it possible to determine accurately the value of the dihedral angle A1 formed by the bezel 11.

During a fourth step, the variations in the skew angle Cj are deduced as a function of the relative positions of the first and second longitudinal curves 17 and 18. More precisely, for each cross-section Sj of the bezel, the skew angle Cj is determined as a function of the relative position of the traces $P_1j$, $P_2j$ of the first and second longitudinal curves 17, 18 in this cross-section Sj.

In this embodiment of the invention, it is assumed that the dihedral angle A1 of the bezel 11 of the eyeglass frame 10 remains constant all around the internal outline of the rims 14.

The skew angle is calculated for each of the 360 sections Sj of the bezel using the formula:

$$Cj = A1/2 - \arctan[I/(R_1j - R_2j)]$$

In a variant, the second longitudinal curve of the bezel 11 may be read differently.

In this variant, in order to read the second longitudinal curve 18, while the turntable 6 is stationary, the electronic and/or computer device 100 controls the actuator means in such a manner that firstly they impart a constant upward vertical bias force on the feeler 8, and secondly they reduce the radial position of the feeler so that the feeler is spaced apart radially from the bottom edge 12 of the bezel 11 by a distance J.

Thereafter, the actuator means cause the turntable 6 to pivot so that the feeler finger 8b remains constantly above the bottom edge 12 of the bezel 11, at a radial distance therefrom equal to the distance J.

The electronic and/or computer device 100 then reads the three-dimensional coordinates $R_2j$, $TETAj$, $Z_2j$ of 360 points $P_2j$ of the second longitudinal curve 18 of the bezel 11.

It should be observed that the radial coordinates $R_2j$ of the points $P_2j$ are equal to the radial coordinates $R_1j$ of the corresponding points $P_1j$, with the constant J being subtracted therefrom.

In this variant, the skew angle is calculated for each of the 360 sections Sj of the bezel using the formula:

$$Cj = A1/2 - \arctan[(Z_2j - Z_1j)/J]$$

Figure 7:
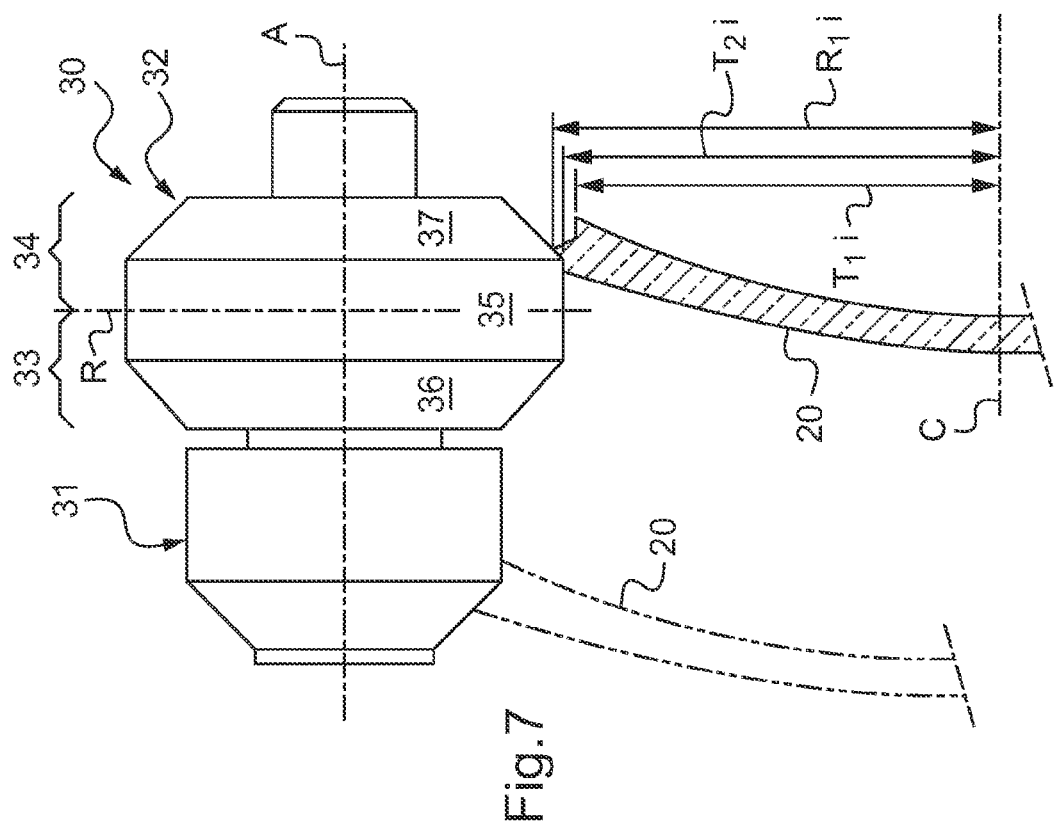
FIG. 7 is a diagrammatic view of a finishing grindwheel beveling an ophthalmic lens.

In any event, during a fifth step that is shown more particularly in FIG. 7, the ophthalmic lens 20 is shaped and beveled.

In order to shape the lens, a cylindrical grindwheel (not shown) is used that is suitable for reducing the radii of the lens as a function of the shape of the first longitudinal curve of the bezel and as a function of the skew angle Cj.

More precisely, from the first step of reading the shape of the bottom edge 12 of the bezel 11, the shape of the first longitudinal curve of the bezel 11 is known. The inclination of the bezel around the rim 14 is also known.

To summarize, at each cross-section Sj of the bezel (corresponding to a corresponding axial section Si of the ophthalmic lens 20), the three-dimensional coordinates $R_1j$, $TETAj$, $Z_1j$ of the trace $P_1j$ of the first longitudinal curve 17 in this section is known, as is the value of the skew angle Cj of the bezel 11.

The width C1 of the opening of the bezel 11 and the peak angle B1 of the engagement ridge 24 (which depends on the shape of the grindwheel used) are also known, so the electronic and/or computer device 100 can calculate the shape and the position that needs to be presented by the peak edge 24C of the engagement ridge 24 relative to the first longitudinal curve 17 so that the lens can be engaged properly in its rim. These calculated characteristics provide a shaping radius setpoint to the shaper device specifying, in the axial section Si of the lens, the radius that should be presented by the peak of the engagement ridge 24 of the lens.

To shape the ophthalmic lens 20, it is blocked along its optical axis so as to be capable of pivoting about said axis, referred to as the blocking axis C. The cylindrical grindwheel is adapted to rotate about an axis of rotation parallel to the blocking axis C. The grindwheel is subsequently put into rotation in contact with the lens so that the radius of the lens is reduced to the desired length at each angular position TETAi of the lens about the blocking axis C. At the end of this shaping, the edge face 23 of the lens presents a profile that is flat.

Thereafter, the lens is beveled so as to form the engagement ridge 24 along its edge face 23.

To perform this beveling, a finishing tool 30 is used of the kind shown in FIG. 7, comprising a polishing wheel 31 adjacent to a finishing wheel 32.

The finishing wheel 32 has a cylindrical working face 35 between two conical working faces 36 and 37, all forming surfaces of revolution about an axis of rotation A of the finishing tool 30. The two conical working faces 36 and 37 are symmetrical about the midplane R of the cylindrical working face. The midplane R defines two working zones 33 and 34 of the finishing wheel 32. One of these working zones 33 is shaped for simultaneously machining one of the sloping flanks 24A of the engagement ridge 24 of the ophthalmic lens 20 together with the corresponding margin 26, while the other of these working zones 34 is shaped for simultaneously machining the other sloping face 24B of the engagement ridge 24 together with the corresponding margin 27.

The ophthalmic lens is held by support shafts (not shown), that enable it to pivot about the blocking axis C. The axis of rotation A of the finishing tool 30 is substantially parallel to the blocking axis C of the ophthalmic lens 20.

While the edge face 23 of the ophthalmic lens 20 is being machined, the electronic and/or computer device 100 controls the axial position of the finishing wheel 32 relative of the blocking axis C of the ophthalmic lens 20 so as to bring a first one of these working zones 33, 34 into position facing one of the faces of the edge face of the ophthalmic lens 20. Thereafter, the electronic and/or computer device 100 controls the radial position of the finishing wheel 32 relative to the blocking axis C so as to put the tool into contact with the lens. Rotation of the tool and pivoting of the lens are then controlled simultaneously so as to machine one of the sloping flanks 24A of the engagement ridge together with the adjacent margin 26. This flank of the engagement ridge 24 is machined in such a manner that, at each axial section Si of the lens, the margin 26 of the edge face of the lens is situated at a radial distance $T_1i$ from the blocking axis C of the lens.

The second sloping flank 24B of the engagement ridge is machined after the first sloping flank has been machined. This second machining operation is performed asymmetrically relative to the first sloping flank. The machining of this front sloping flank 24B of the engagement ridge 24 is performed in such a manner that at each axial section Si of the lens, the margin 27 of the edge face 23 of the lens is situated at a radial distance $T_2i$ from the blocking axis of the lens.

Thus, in each axial section Si of the lens, the two margins 26 and 27 of the edge face of the lens extend along straight lines that are substantially parallel to the blocking axis C of the ophthalmic lens.

According to a particularly advantageous characteristic of the invention, the difference between the radial distances $T_1i$ and $T_2i$ is a function of the axial section Si under consideration of the ophthalmic lens, it is referred to as the "altitude difference function", and it is not uniform. The equation for this altitude difference function is calculated as a function of variation in the skew angle Cj of the bezel 11. It is calculated before machining the lens so as to make it possible to control the finishing wheel as desired. An example of such a calculation is provided at the end of this description.

Figure 8:
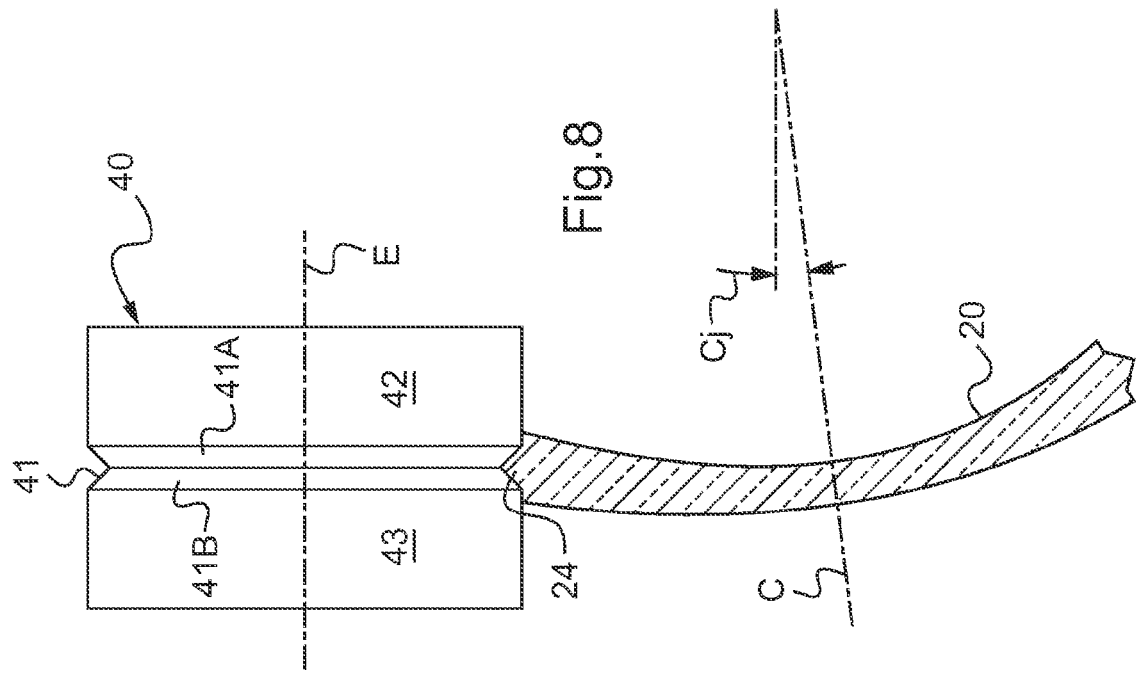
FIG. 8 is a diagrammatic view of a shaper grindwheel beveling an ophthalmic lens in a variant implementation of the invention.

In a variant implementation of the invention as shown in FIG. 8, both flanks of the engagement ridge 24 of the ophthalmic lens 20 can be made simultaneously. The tool used for beveling is a conventional beveling grindwheel 40 in the form of a cylinder that is provided halfway along its length with a beveling groove 41 and that is adapted to revolve about an axis of rotation E that coincides with its axis of revolution. The beveling groove 41 presents a shape complementary to the shape of the engagement ridge that is to be made on the edge of the ophthalmic lens 20. It thus presents two flanks 41A and 41B and it is bordered by two cylindrical faces 42 and 43 that are shaped to machine the margins 26 and 27 of the edge face 23 of the ophthalmic lens.

In this example, the ophthalmic lens 20 is likewise blocked by support shafts (not shown) so as to be capable of pivoting about its blocking axis C.

Advantageously, the axis of rotation E of the beveling grindwheel 40 can be oriented relative to the blocking axis C of the ophthalmic lens 20. The electronic and/or computer device 100 then acts when beveling the ophthalmic lens 20 to control dynamically the orientation of these two axes E and C relative to each other so as to cause the orientation of the margins and of the engagement ridge 24 to vary along the edge face 23 of the ophthalmic lens 20.

This control is implemented in such a manner that, at each axial section Si of the lens, the blocking axis C is inclined relative to the axis of rotation E by an angle that is equal to the skew angle Cj of the profile 11A of the bezel 11 in the cross-section Sj corresponding to the axial section Si under consideration of the lens.

Consequently, the engagement ridge 24 of the ophthalmic lens 20 is inclined in the same manner as the bezel 11 of the rim 14 that is to receive the lens.

In general, the bezels of eyeglass frames present a dihedral angle A1 that is constant in zones of the frame rims that have little skew, while varying in zones with greater skew. Consequently, the above calculations for determining the skew Cj of the bezel 11 of the frame present small inaccuracies.

In a first variant implementation of the invention, the skew Cj of the bezel 11 can be calculated without having recourse to the dihedral angle A1 of the bezel 11.

In this variant implementation of the invention, the first two steps of acquiring the shape of the bezel 11 are identical (feeling the first and second longitudinal curves 17, 18).

During a third step, the electronic and/or computer device 100 proceeds with feeling a third longitudinal curve 19 of the bezel. The second and third longitudinal curves 18 and 19 each lie on a distinct one of the flanks 13 of the bezel 11.

The shape of the third longitudinal curve 19 is read in the same manner as the shape of the second longitudinal curve 18, but while keeping the feeler 8 against the other flank 13 of the bezel 11, below the bottom edge 12 of the bezel 11, being spaced apart by the height I. Thus, the electronic and/or computer device 100 reads the three-dimensional coordinates $R_3j$, $TETAj$, $Z_3j$ of 360 points $P_3j$ of the third longitudinal curve 19 of the bezel 11.

It should then be observed that the altitude $Z_3j$ of each point $P_3j$ is equal to the altitude $Z_1j$ of the corresponding point $P_1j$ of the first longitudinal curve 17 from which the constant I has been subtracted.

During a fourth step, the skew angle Cj of each of the sections Sj of the bezel is calculated as a function solely of the relative positions of the points $P_1j$, $P_2j$, $P_3j$ of each section Sj of the bezel 11.

Thus, for each section Sj, the skew angle Cj may be calculated using the following formula:

$$Cj=0.5[\arctan(I/(R_1j-R_3j))-\arctan(I/(R_1j-R_2j))]$$

It should be observed at this point that reading the outlines of the three longitudinal curves 17, 18, and 19 enables skew to be calculated accurately in a manner that does not depend on the dihedral angle A1 of the bezel 11 (this angle may possibly vary around the internal outline of the rim 14, which would make calculation erroneous).

When the bezel presents a section that is not V-shaped, but that presents some other shape such as a semicircle, then the above formula can naturally be adapted to match. For this purpose, the electronic and/or computer device may contain in memory a plurality of mathematical formulae, each adapted to a particular shape of bezel. In order to determine which formula to use, the electronic and/or computer device may make use of the sliding of the feeler along the flanks of the bezel (when the feeler moves out from the bottom of the bezel in order to be placed at the height of the second longitudinal curve) in order to determine the shape of the section of the bezel, and thus determine which mathematical formula is best suited to this shape of bezel.

In any event, after skew has been calculated at all points around the internal outline of each rim 14, the electronic and/or computer device 100 can determine the altitude difference function very accurately for machining the ophthalmic lens 20 so that it can engage very accurately in the corresponding bezel 11 of one of the rims 14 of the eyeglass frame.

Figure 6A:
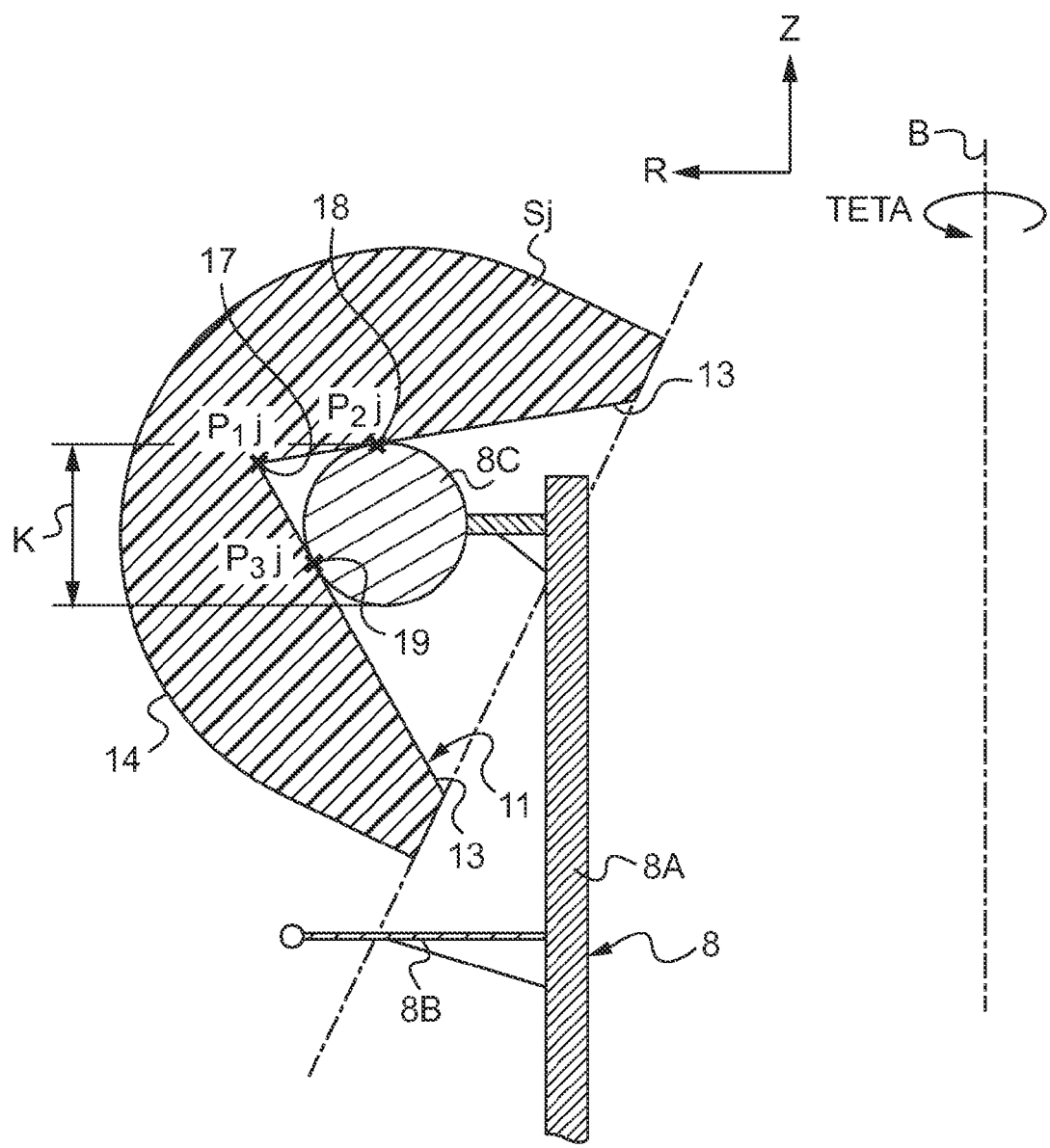
FIGS. 6A and 6B are theoretical diagrams showing how the shape of the bezel of the FIG. 1 eyeglass frame rim is acquired by a feeler in two variant implementations of the invention.

In a variant, and as shown in FIG. 6A, the second and third longitudinal curves 18 and 19 may be read simultaneously with the help of a suitable feeler 8.

In this variant, the feeler 8 presents at its top end, not only a feeler finger 8B identical to that described above, but also a feeler sphere 8C of large diameter K. In the example shown in FIG. 6A, this feeler sphere is placed at the top of the support rod 8A, far enough away from the feeler finger 8B to avoid any conflict between the feeler finger and the rim 14 while the bezel is being felt using the feeler sphere.

Figure 6B:
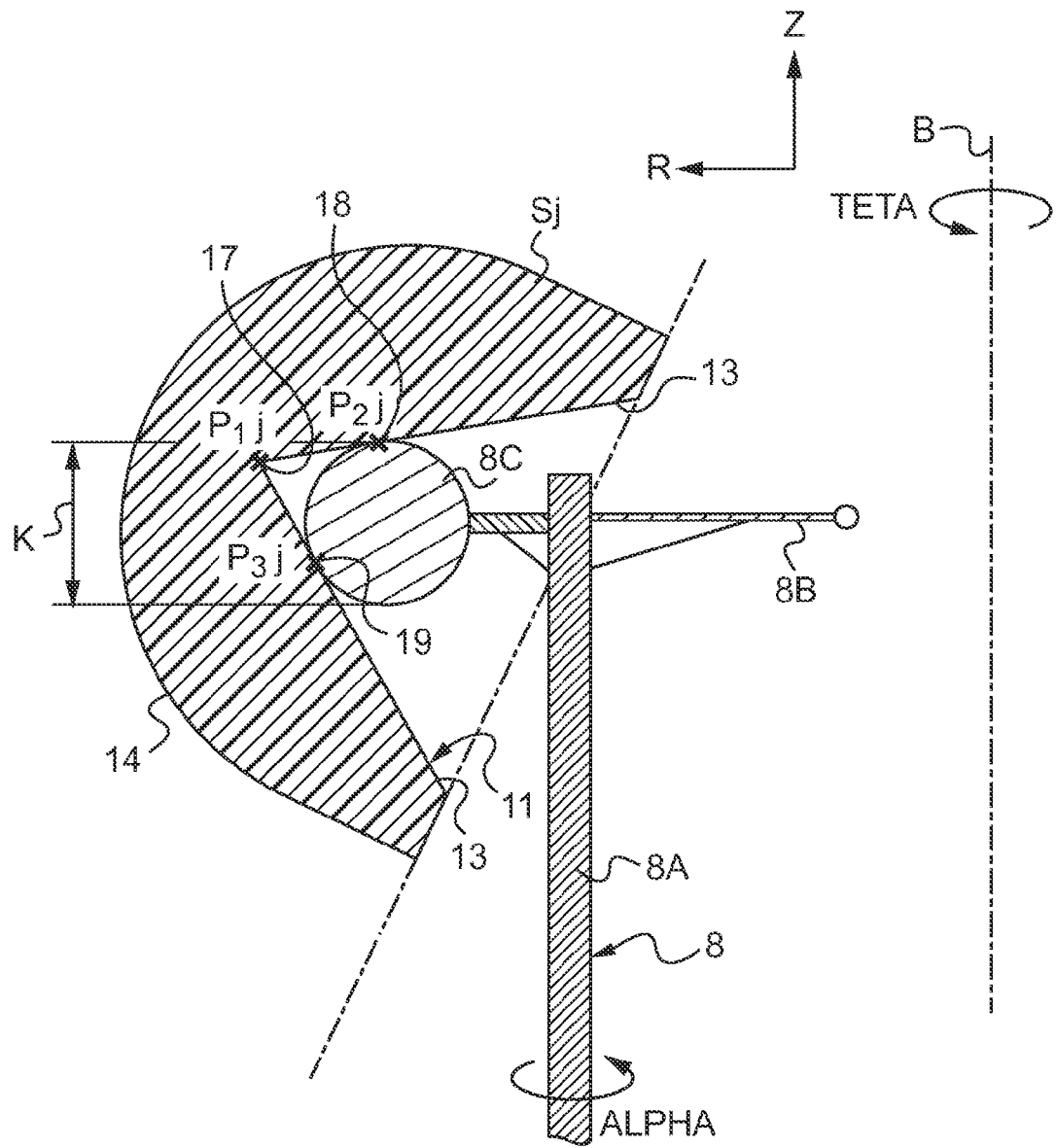

In a variant, as shown in FIG. 6B, the feeler sphere 8C may be placed diametrically opposite from the feeler finger 8B about the axis of the support rod 8A. The feeler 8 then needs to present an additional degree of freedom in movement constituted by freedom to pivot through an angle ALPHA about the axis of the support rod 8A so as to enable it to perform an about-turn. By pivoting in this way, the feeler sphere presents a position that is interchangeable with the feeler finger 8B for reading the bezels 11.

In any event, the diameter K of the sphere is calibrated, and its position relative to the end of the feeler finger 8B is known, so that the positions of the points on its spherical surface can be determined by the electronic and/or computer device 100.

To feel the second and third longitudinal curves, the electronic and/or computer device 100 controls the movements of the feeler 8 so as to put the feeler sphere 8C into contact with the bezel 11. Since it is of large diameter K, the feeler sphere 8C does not come into contact with the bottom edge 12 of the bezel 11, but rather comes into contact with two points $P_2j$, $P_3j$ each disposed on a respective one of the flanks of the bezel 11.

Thereafter, the actuator means cause the turntable 6 to pivot so that the feeler sphere 8C feels the entire outline of the rim 14 of the frame, while remaining in contact with the flanks 13 of the bezel 11.

Knowing the shape of the bottom edge 12 of the bezel 11, the electronic and/or computer device 100 determines which points of the spherical surface of its feeler sphere 8C are in contact with the bezel 11 and thus reads the three-dimensional coordinates $R_2j$, $TETAj$, $Z_2j$, and $R_3j$, $TETAj$, $Z_3j$ of the points $P_2j$ and $P_3j$ of the second and third longitudinal curves 18, 19.

Calculation of the skew of the bezel and machining of the edge face 23 of the lens 20 are then performed using a method analogous to that described above.

In a second variant implementation of the invention, it is possible to define the accuracy with which the skew angle $Cj$ is calculated in highly skewed zones of the frame. In this variant, the first two steps of reading the first and second longitudinal curves 17 and 18, and the third step of reading a profile 11A of the bezel 11 remain identical.

However, the fourth step of calculating the skew of the bezel is somewhat modified. Initially, the electronic and/or computer device 100 uses the above-provided mathematical formula to calculate an approximation to the skew angle $Cj$ of the bezel at a plurality of cross-sections $Sj$ of the bezel 11 (FIG. 4A). Thereafter, the electronic and/or computer device 100 proceeds to feel the profiles 11A of additional sections $Sj$ of the bezel 11.

In order to identify which profiles of the bezel to feel, the electronic and/or computer device 100 selects a section plane Y in which the approximate skew angle $Cj$ of the bezel is less than a predetermined threshold value, and one or more other section planes Y in which the approximate skew angle $Cj$ of the bezel is greater than said threshold value. Thereafter, it causes the profiles of the bezel to be felt in these identified section planes Y. It is known that the profile of the bezel varies little in the zones of the rims 14 that present little skew, which is why the profile of the bezel is felt at only one section of the bezel that presents little skew. In contrast, the shape of the profile of the bezel may vary significantly in skewed zones of the frame rims (temporal zones), which is why the profile of the bezel is felt at a plurality of skew sections thereof.

In a variant, the electronic and/or computer device 100 may feel a predefined plurality of cross-sections $Sj$ of the bezel. In this variant, the device does not calculate an approximate skew angle $Cj$ for the bezel in order to determine which cross-sections to feel. On the contrary, it proceeds directly with feeling a plurality of bezel profiles, e.g. two or three such profiles, at angular positions $TETAj$ that are predetermined (e.g. 0 degrees to feel the profile in the bottom portion of the rim, 90 degrees to feel the profile in a temporal portion of the rim, and 180 degrees to feel the profile in a top portion of the rim).

In another variant, if the electronic and/or computer device 100 is connected to a graphics interface that provides the user with an image of the first longitudinal curve 17 once it has been felt, the user may point directly on the displayed image to the cross-sections $Sj$ where the feeler is to feel.

In any event, feeling two or three profiles 11A of the bezel 11 makes it possible to determine the dihedral angles A1 formed by the bezel 11 at each of the cross-sections $Sj$ that has been read. From these dihedral angles, the electronic and/or computer device 100 can then calculate approximately the variations in the dihedral angle A1 of the bezel 11 all around the internal outline of the rim 14 of the eyeglass frame 10.

Since the dihedral angle A1 is then a variable, the electronic and/or computer device 100 proceeds with a refined calculation of the skew of the bezel by using the following mathematical formula:

$$Cj = A1_{TETA}/2 - \arctan[(Z_2j - Z_1j)/J]$$

In this third variant implementation of the invention, the electronic and/or computer device determines the skew angle $Cj$ at a plurality of cross-sections $Sj$ of the bezel 11 but it feels only a single longitudinal curve.

In this variant, the first step of reading the shape of the first longitudinal curve 17 remains identical.

During a second step, the electronic and/or computer device 100 controls the actuator means of the feeler 8 so that it feels a plurality of cross-sections $Sj$ of the bezel 11 at predetermined angular positions $TETAj$. For example, it may control feeling of ten profiles 11A of the bezel that are distributed regularly around the outline of the rim 14.

During a third step, the device calculates the skew angle $Cj$ of each of these ten sections of the bezel. Thereafter, it uses conventional interpolation calculations to determine the skew angle $Cj$ for all of the profiles 11A of the bezel. The step of machining the edge face 23 of the ophthalmic lens 20 is then performed in identical manner.

In other variant implementations of the invention, during the first step of the above-described method, it is possible to acquire the shape of one or more longitudinal curves of the bezel 11 and the shape of one or more profiles 11A of the bezel 11 differently.

For example, it is possible to acquire these shapes by means of a database registry. In this example, the database registry contains a plurality of records each associated with a referenced type of eyeglass frame (i.e. a shape of eyeglass frame). More precisely, each record includes an identifier corresponding to the type of eyeglass frame under consideration, and a table of values, e.g. referencing the three-dimensional coordinates of 360 points $P_1j$ characteristic of the shape of the first longitudinal curve 17. Thus, to acquire the shape of this curve, the user searches the database for the record having an identifier that corresponds to the eyeglass frame selected by the wearer. Thereafter, the values referenced in this record are used by the electronic and/or computer device 100 to calculate the skew of the bezel 11 all around the rim of the eyeglass frame.

Another example that enables the shape of the bezel to be acquired consists in using laser imaging to read the shape of the bezel as a whole, in three dimensions. Document EP 1 353 141 in the name of the Applicant describes an example of apparatus and a method enabling such three-dimensional reading to be performed. It can be understood that reading in that way provides the shape of a plurality of longitudinal curves of the bezel and the shape of the profile of the bezel at a plurality of cross-sections of the bezel. The electronic and/or computer device can then determine the skew angle of the bezel profile at each section of the bezel.

In another implementation of the invention, the altitude difference function is determined by taking into consideration the fact that the rim of the eyeglass frame lies approximately on the surface of a sphere.

In this implementation, during a first step, the shape of a longitudinal curve 17 of the bezel 11 is read. This reading may be performed, for example, by feeling the bottom edge 12 of the bezel 11, as explained above. This provides the coordinates $R_1j$, $TETAj$, $Z_1j$ of a plurality of points $P_1j$ along said first longitudinal curve 17.

The object is then to determine axial and radial shape setpoints for shaping and beveling the ophthalmic lens by means of the finishing wheel 32 (FIG. 7). These setpoints need to provide the coordinates $R_1i$, $TETAi$, $Z_1i$ of a plurality of points $Q_1i$ of the directing longitudinal curve 25 of the engagement ridge 24 that is to be formed on the edge face 23 of the lens. They also need to provide the distances $T_1i$, $T_2i$ to the blocking axis C for each of the margins 26, 27 of the edge face of the lens.

The distances $T_1i$, $T_2i$ to the blocking axis C of each of the margins 26, 27 can be calculated either solely from the dihedral angle A1 of the bezel 11 and the skew of the bezel 11, or else by determining the engagement configuration of the engagement ridge of the lens 20 in the bezel 11 of the frame rim 14 on a section by section basis. It is this second method that is described below.

Figure 9:
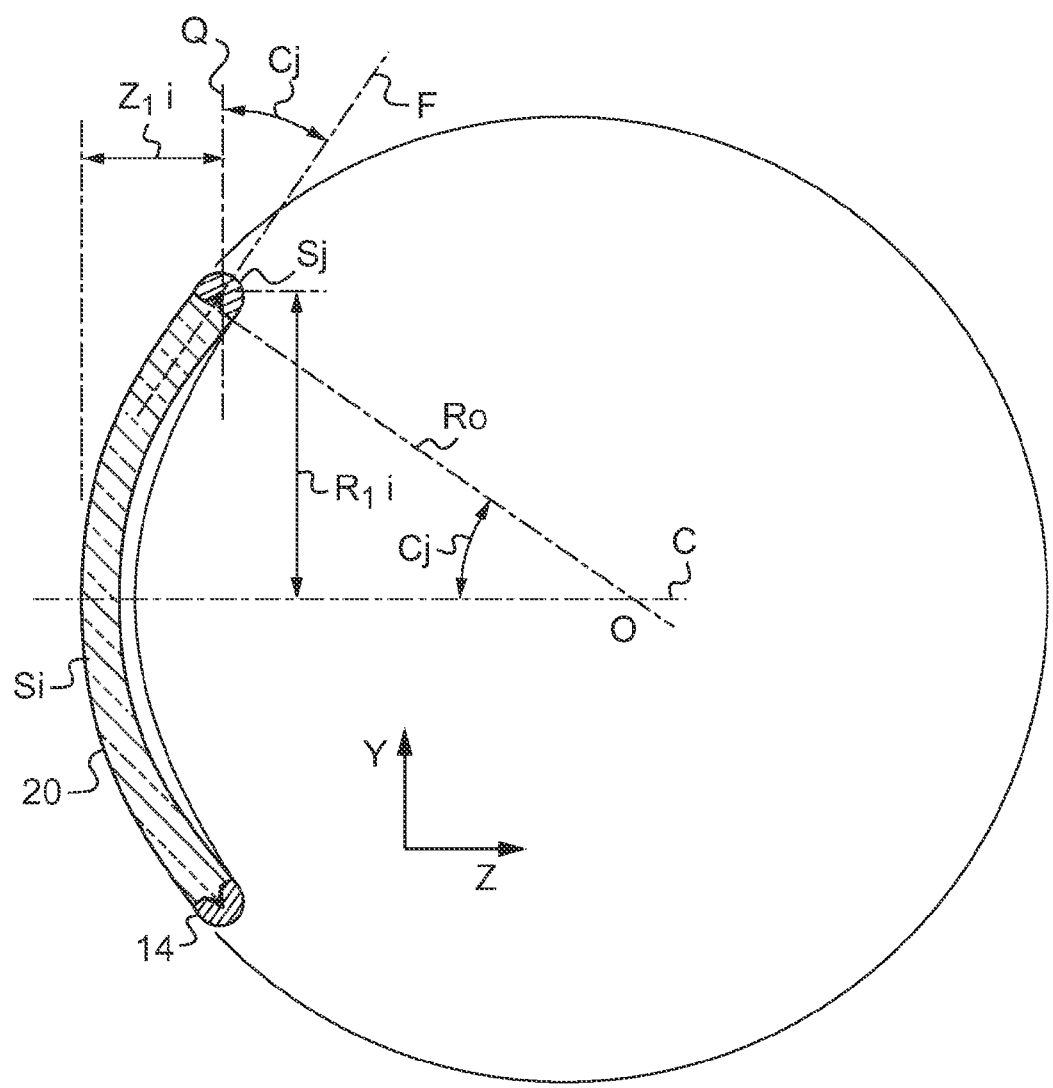
FIG. 9 is a diagrammatic cross-section view of a FIG. 1 eyeglass frame rim having an ophthalmic lens engaged therein.

With reference to FIG. 9, it is known in conventional manner that the first longitudinal curve 17 of the bezel 11 lie substantially on the surface of an inscribed sphere of center O (having coordinates $x_0$, $y_0$, $z_0$ in an arbitrary rectangular frame of reference) and of radius $R_0$. It should be observed that the center O the sphere generally lies on the blocking axis C of the ophthalmic lens 20.

As can be seen in FIG. 9, the skew angle Cj of a profile 11A of a cross-section Sj of the bezel 11 depends on the position of the profile 11A on the sphere. In particular, the further the profile 11A is from the blocking axis C, the greater its skew angle Cj.

In order to determine the skew angle Cj of each profile of the bezel, one solution then consists in determining firstly the position of the profile on the sphere, and secondly the coordinates $x_0$, $y_0$, $z_0$ of the center O of the sphere, together with the value of its radius $R_0$.

To determine these coordinates and this radius, a first method consists in solving a system of four equations in four unknowns:

$$R_0^2 = (x_j - x_0)^2 + (y_j - y_0)^2 + (z_j - z_0)^2$$

where $x_j$, $y_j$, and $Z_j$ are the Cartesian coordinates of four traces $P_1j$ of the first longitudinal curve 17 of the bezel 11 in the rectangular frame of reference under consideration.

Since the first longitudinal curve 17 does not, in fact, lie exactly on a sphere, which four traces are selected from the set of traces of the first longitudinal curve 17 has an influence on the result of the calculation. This calculation is therefore of limited accuracy. It is possible to increase this accuracy by referring not to four traces $P_1j$ of the first longitudinal curve 17 of the bezel 11, but to a larger number N of traces $P_1j$.

In this situation, the coordinates for the center O of the sphere and its radius $R_0$ are determined by minimizing the following function f:

$$f = \text{sum}[(x_j - x_0)^2 + (y_j - y_0)^2 + (z_j - z_0)_2 - R_0^2]^2$$

for j in the range 1 to N.

There are various methods in existence for minimizing this function. Amongst these methods, it is possible to use the conjugate gradient method as described in the work "Numerical recipes in C—The art of scientific computing", second edition published by Cambridge University Press, pages 420 to 425.

Once these calculations have been performed, the electronic and/or computer device possesses the characteristics of this sphere in its memory.

In a first variant of the invention, the coordinates of the center O of the sphere and/or the value of its radius $R_0$ may be acquired by the user from the value of the curvature of the spherical front face of the ophthalmic lens 20 (that is provided to the user on purchasing the lens, or that can be determined by feeling the front face of the lens) or from a value that is characteristic of the overall camber of the eyeglass frame 10 (an eyeglass frame is generally made flat and then deformed so as to be cambered about a defined camber radius that corresponds overall to the radius $R_0$ of the sphere).

In any event, the electronic and/or computer device then proceeds to calculate the skew angle Cj of the bezel 11 at each cross-section Sj of the bezel 11 by applying the following formula:

$$Cj = \arcsin([(x_j - x_0)^2 + (y_j - y_0^2)]^{1/2} / R_0)$$

The calculation of this skew angle then makes it possible subsequently to machine the edge face 23 of the ophthalmic lens 20 directly using the implementation described above and shown in FIG. 8.

In order to machine the edge face 23 of the lens in the implementation described above and shown in FIG. 7, it is appropriate to determine the exact configuration, section by section and point by point of the engagement between the engagement ridge 24 of the lens and the bezel 11.

When the ophthalmic lens 20 presents suitable thickness across its edge face 23, the margins 26 and 27 of the edge face 23 are of greater width. It will be understood that when the bezel is highly skewed and/or that its own margin 14A is of considerable width, the peripheral edge of the rear optical face of the ophthalmic lens can come into conflict with this margin 14A of the inside face of the rim 14.

At this point, we therefore propose determining the exact configuration, point by point, of the engagement between the engagement ridge 24 of the lens and the bezel of the frame so as to prevent such conflicts arising. To do this, the shape of the profile of the bezel 11 is determined at a plurality of cross-sections Sj so as to determine the shape that the profile 23A of the edge face 23 of the lens needs to present at a plurality of axial sections Si corresponding to said cross-sections Sj.

More precisely, the electronic and/or computer device 100 needs to calculate the three-dimensional coordinates of a plurality of points (here h points where the number h is greater than 5) of the profile 11A of the bezel 11 at a plurality of cross-sections Sj of the bezel.

To do this, the method proceeds by feeling the profile 11A of a first cross-section Sm of the bezel 11. The three-dimensional coordinates of a plurality of points $P_1m$, $P_2m$, ..., $P_hm$ are thus read of the profile of this first section Sm of the bezel 11.

Then, for each other cross-section Sn of the bezel 11, the method deduces the three-dimensional coordinates of the points $P_1n$, $P_2n$, ..., $P_hn$ of the profile of the bezel in each section Sn. These points correspond to the points $P_1m$, $P_2m$, ..., $P_hm$ of the profile of the first section Sm of the bezel.

Knowing the skew angle Cm of the bezel 11 at the first section Sm and the skew angle Cn of every other section Sn of the bezel 11, the electronic and/or computer device 100 deduces the positions of the corresponding points $P_1n$, $P_2n$, ..., $P_hn$ of the profile at each other section Sn of the bezel 11 by applying a rotation matrix M to the vector $[R_im, Z_im]$ of coordinates for each point $P_im$ of the profile of the first section of the bezel, where the matrix M is given as follows:

$$M = [\cos p, \sin p]$$

$$[-\sin p, \cos p] \text{ with } p = Cn - Cm$$

These calculations make it possible in particular to reduce the width and the position of each flank of the bezel and of each of its margins 14A, and also the dihedral angle A1 of the bezel.

At this stage in this implementation of the invention, the electronic and/or computer device knows, at each axial section Si of the lens and at each corresponding cross-section Sj of the bezel:

the skew angle Cj of the bezel;

the dihedral angle A1 of the bezel (FIG. 2A) which is assumed to be constant all along the bezel;

the angle E1 formed by the profile of one or of the other of the sloping flanks 24A, 24B of the engagement ridge 24 relative to the blocking axis C (FIG. 2B), which angle is calculated from the peak angle of the conical working surfaces 36, 37 of the finishing wheel 32 (FIG. 7);

the angle B1 at the peak of the engagement ridge, given by Pi−2E1 (where Pi=3.14 . . . );

the width L1 of the front flank of the bezel 11;

the width L2 of the rear flank of the bezel 11;

the width L3 of the front margin 14A of the inside face of the rim 14; and the width L4 of the rear margin 14A of the inside face of the rim 14.

In order to define axial and radial setpoints for the shape of the peak 24C for shaping the engagement ridge 24, it is then necessary to take account of the skew Cj of the bezel 11. It is also desired to determine the distances S1 and S2 extending radially between the peak 24C of the engagement ridge 24 from each of the segments of the profiles of the front and rear margins 27 and 26 of the edge face of the ophthalmic lens 20.

Figure 10:
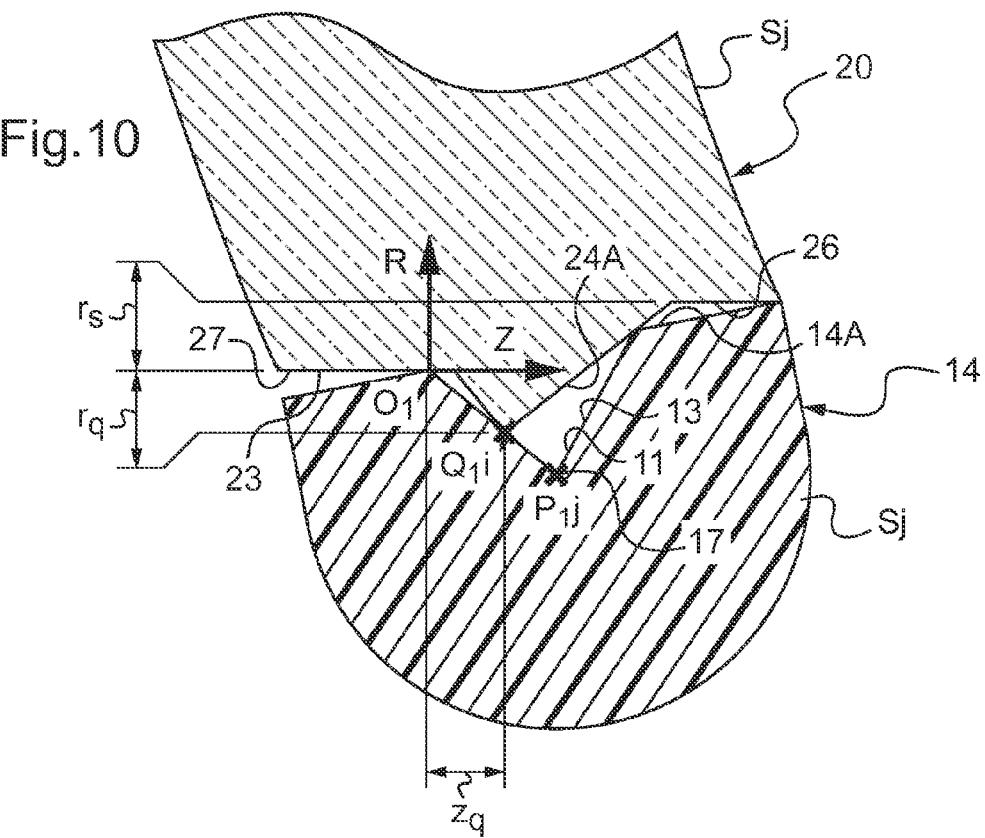
FIGS. 10 and 11 are fragmentary axial section views of an ophthalmic lens shaped in accordance with the invention and engaged in the bezel of one of the FIG. 1 eyeglass frame rims.
Figure 11:
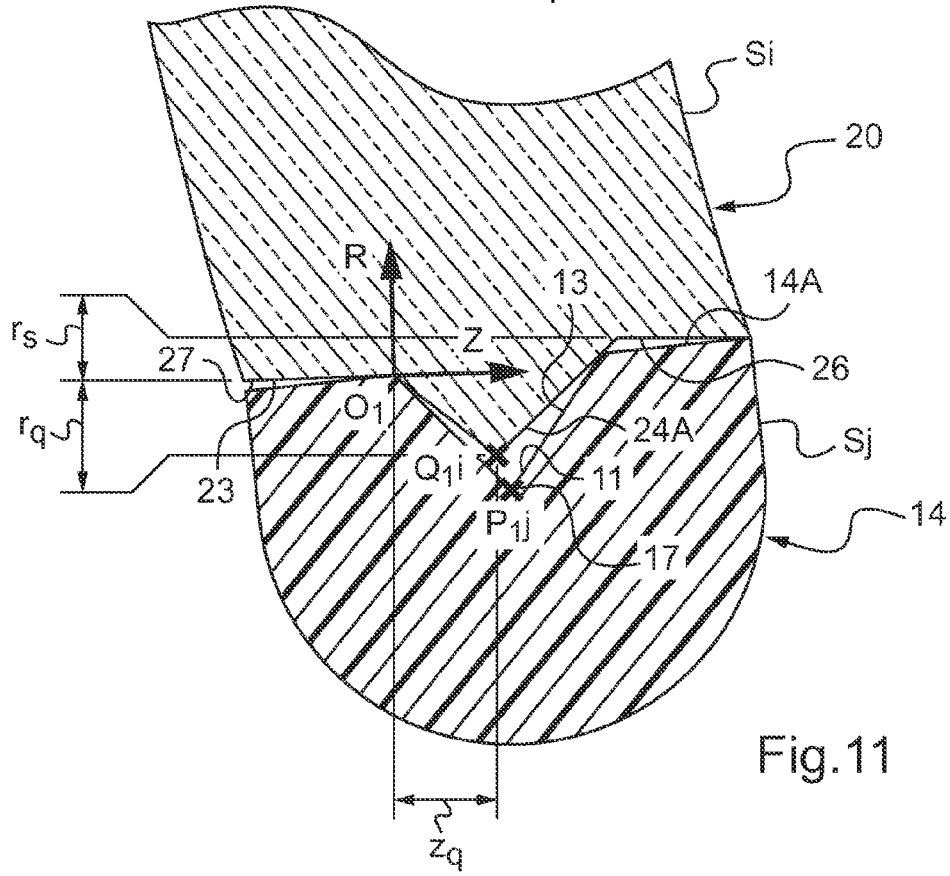

To do this, for each axial section Si of the lens, a frame of reference O1, Z, R is used in which the origin O1 belongs to the edge of the bezel 11 connecting the front face 13 of the bezel 11 to the corresponding front margin 14A (FIGS. 10 and 11). The coordinates of a point in this frame of reference are defined by r, z.

In this frame of reference, equations are determined for:

the straight line of the profile of the front flank of the bezel:

$$r = \tan(a_0) \cdot z$$

with $a_0 = A1/2 + Cj - Pi/2$;

the straight line of the profile of the rear flank of the bezel:

$$r = \tan(a_1) \cdot z + L1 \cdot [\sin(a_0) - \tan(a_1) \cdot \cos(a_0)]$$

with $a_1 = Cj - Pi/2 - A1/2$;

the straight line of the profile of the rear margin 14A:

$$r = \tan(Cj) \cdot z + L1 \cdot [\sin(a_0) - \tan(Cj) \cdot \cos(a_0)] + L2 \cdot [\sin(a_1) - \tan(Cj) \cdot \cos(a_1)]$$

the straight line of the profile of the rear flank 24A of the engagement ridge 24:

$$r = \tan(E1) \cdot z + L1 \cdot [\sin(a_0) - \tan(B1) \cdot \cos(a_0)] + L2 \cdot [\sin(a_1) - \tan(E1) \cdot \cos(a_1)]$$

Two engagement configurations for the engagement ridge 24 in the bezel 11 of the frame are possible.

In a first engagement configuration, as shown in FIG. 10, the front flank of the bezel slopes more steeply than the front flank of the engagement ridge (E1>$a_0$). Under such circumstances, the two points of contact in the section under consideration between the engagement ridge and the bezel are firstly the contact point at the peak $Q_1$i of the engagement ridge 24 and one of the flanks of the bezel 11, and secondly the contact point of the rear flank of the engagement ridge 24 with the edge of the bezel 11 connecting the rear flank 13 of the bezel to the corresponding front margin 14A.

Under such circumstances, the peak $Q_1$i of the engagement ridge 24 is situated at the point of intersection between the straight line of the profile of the front flank of the bezel and the straight line of the profile of the rear flank 24A of the engagement ridge 24.

It is then possible to calculate the coordinates of this peak:

$$zq = \frac{(L1 \cdot [\sin(a_0) - \tan(E1) \cdot \cos(a_0)] + L2 \cdot [\sin(a_1) - \tan(E1) \cdot \cos(a_1)])}{(\tan(a_0) - \tan(E1))}$$

$$rq = \tan(E1) \cdot z_q + L1 \cdot [\sin(a_0) - \tan(E1) \cdot \cos(a_0)] + L2 \cdot [\sin(a_1) - \tan(E1) \cdot \cos(a_1)]$$

The equations of the straight line of the profile of the front flank 24B of the engagement ridge 24 is deduced from these coordinates, as follows:

$$r = -\tan(E1) \cdot z + r_q + \tan(E1) \cdot z_q$$

In a second engagement configuration, as shown in FIG. 11, the front flank of the bezel slopes less than the front flank of the engagement ridge (E1<$a_0$). Under such circumstances, the two points of contact in the section under consideration between the engagement ridge and the bezel are disposed on the edges at the opening of the bezel.

Under such circumstances, the peak $Q_1$i of the engagement ridge 24 lies at the point of intersection between the straight line of the profile of the rear flank 24A of the engagement ridge 24 and the straight line of the profile of its front flank 24B.

The coordinates of this peak can then be calculated as follows:

$$zq = \frac{(L1 \cdot [\sin(a_0) - \tan(B1) \cdot \cos(a_0)] + L2 \cdot [\sin(a_1) - \tan(B1) \cdot \cos(a_1)])}{(-2 \cdot \tan(E1))}$$

$$rq = \tan(E1) \cdot z_q + L1 \cdot [\sin(a_0) - \tan(E1) \cdot \cos(a_0)] + L2 \cdot [\sin(a_1) - \tan(E1) \cdot \cos(a_1)]$$

At this stage, the electronic and/or computer device has in its memory the coordinates of the peak $Q_1$i of the engagement ridge 24 and the coordinates of the bottom $P_1$j of the bezel in the frame of reference O1, Z, R, regardless of the engagement configuration. Then, using a reference change matrix, it is possible to determine the coordinates of a plurality of traces of the peak of the engagement ridge 24 in a single frame of reference, that in which the lens is machined.

It is then appropriate to determine the radial distances between the peak of the engagement ridge 24 and each of the two profile segments of the margins 26, 27 of the edge face of the lens in the section under consideration.

Since the front margin is located level with the origin O1 of the selected frame of reference, the distance radially between the front margin and the peak $Q_1$i of the engagement ridge 24 corresponds to the value $r_q$.

The radial position $r_s$ of the rear margin 26 of the edge face of the lens is calculated so that this margin is located as close as possible to the rear margin 14A of the rim 14. The rear margin 26 of the lens is then placed at the point of the profile of the bezel that has the largest coordinates r.

Thus:

$$r_s = L2 \cdot \sin(a_1) + L1 \cdot \sin(a_0) + L4 \cdot \sin(Cj) - r_q$$

Knowing the coordinates of the peak $Q_1i$ of the engagement ridge in the frame of reference O1, Z, R together with the radial positions relative to said peak of each of the margins 26, 27 of the edge face of the lens, the device 100 proceeds to calculate the axial and radial setpoints for shaping the lens in the frame of reference of the grinder attached of the blocking axis C. In particular, it calculates the distances $T_1i$, $T_2i$ of each of the margins of the edge face of the lens relative to the blocking axis C of the lens.

Naturally, in a variant, it is possible to machine the margins of the edge face of the lens a little more deeply relative to the peak of the engagement ridge so as to be sure that these margins do not interfere with the rim of the frame.

In a variant, it is also possible to machine the peak of the engagement ridge so as to give it a rounded shape, while taking account of the above-described calculations, so as to make the peak stronger.

Otherwise, there would be a risk during forced mounting of the lens in the rim 14 from the front face of the rim that the peak would be pared away, which would then be harmful to retention of the lens 20 in the rim 14 of the eyeglass frame 10.

The invention claimed is:

1. A method of shaping an ophthalmic lens (20), the method comprising machining the edge face (23) of the lens (20) by means of at least one rotary tool having an axis, the axes of the tool and of the lens being movable relative to each other in rotation about a blocking axis (C) and in translation, both radially and axially, these freedoms of movement being controlled so that the edge face (23) of the lens presents a generally profiled shape that includes an engagement ridge (24) suitable for engaging in a bezel (11) of a rim (14) of an eyeglass frame (10), and first and second margins (26, 27) on either side of the engagement ridge (24); the method being characterized in that given a first longitudinal curve (28) of the first margin (26) and a second longitudinal curve (29) of the second margin (27), the edge face (23) of the lens (20) is machined in such a manner that, at each axial section (Si) of the lens (20), the traces ($Q_2i$, $Q_3i$) in said axial section (Si) of the first and second longitudinal curves (28, 29) of the two margins (26, 27) present respective first and second distances ($T_1i$, $T_2i$) from the blocking axis (C) of the lens (20), with the difference therebetween being a function, referred to as an "altitude difference function", of the position of the plane (X) of the axial section (Si) under consideration along the edge face (23) of the lens (20), which function is not entirely uniform.

2. A method according to claim 1, wherein the engagement ridge (24) is machined in compliance with axial and radial shape setpoints giving, as a function of the position of the plane (X) of the axial section (Si) under consideration of the lens (20), respectively the axial and radial positions of the trace ($Q_1i$) of a directing longitudinal curve (25) of said engagement ridge (24) in said axial section (Si), and wherein said altitude difference function incorporates at least one of the axial and radial setpoints for the shape of the directing longitudinal curve (25) in the axial section (Si) under consideration along the edge face (23) of the lens (20).

3. A method according to claim 2, wherein said altitude difference function includes a parameter ($R_0$) that is characteristic of the overall shape of one of the optical faces (21, 22) of the ophthalmic lens (20) or of a longitudinal curve (17, 18, 19) of the bezel (11) of the rim (14) of the eyeglass frame (10).

4. A method according to claim 3, wherein said parameter characteristic of shape comprises a radius ($R_0$) of a spherical base approximating to the shape of the ophthalmic lens (20), or of a longitudinal curve (17) of the bezel of the rim (14) of the eyeglass frame (10).

5. A method according to claim 2, wherein said altitude difference function includes at least one parameter ($R_0$) that is deduced from the radial and axial shape setpoints for the directing longitudinal curve (25) of the engagement ridge (24).

6. A method according to claim 1, wherein the shape of the profile (11A) of the bezel (11) of the rim is obtained by feeling, with or without making contact, at at least one acquired cross-section (Sj) of the rim, and wherein said altitude difference function includes a parameter depending on the shape of the profile (11A) acquired in this way.

7. A method according to claim 6, wherein the shape of a first longitudinal curve (17) of the bezel (11) is obtained, and wherein the position (TETAi) of a section plane (Y) of the, or of at least one of the, felt cross-sections (Sj) of the bezel is identified by calculation, on the basis of the previously acquired shape of the first longitudinal curve (17) of the bezel (11), so that the profile (11A) of the bezel (11) in said felt cross-section (Sj) presents a skew angle (Cj) greater than or less than a predefined threshold value.

8. A method according to claim 6, wherein the position (TETAi) of the section plane (Y) of the, or of at least one of the, felt cross-sections (Sj) of the bezel (11) is predefined or is identified manually by means of a graphics interface including means for pointing to the cross-section (Sj) that is to be felt.

9. A method according to claim 6, including, prior to machining the edge face (23) of the lens (20), acquiring a skew angle (Cj) of the profile (11A) of the bezel (11) or the shape of the profile (11A) of the bezel (11) at a plurality of acquired cross-sections (Sj) of the bezel (11).

10. A method according to claim 9, wherein the engagement ridge (24) is machined in compliance with a shaping radius setpoint that is calculated by simulating engagement of the engagement ridge (24) in the bezel (11) of the eyeglass frame (10) as a function of the skew angle (Cj) of the profile (11A) of the bezel (11) at each section of the plurality of acquired cross-sections (Sj) of the bezel (11).

11. A method according to claim 9, wherein the engagement ridge (24) is machined in compliance with a shaping axial setpoint that is calculated by simulating the engagement of the engagement ridge (24) in the bezel (11) of the eyeglass frame (10) as a function of the skew angle (Cj) of the profile (11A) of the bezel (11) or as a function of the shape of the profile (11A) of the bezel (11) at each section of the plurality of acquired cross-sections (Sj) of the bezel (11).

12. A method according to claim 1, wherein the edge face (23) of the lens (20) is machined in such a manner that the orientation of the profile (23A) of the edge face (23) of the ophthalmic lens (20) relative to the blocking axis (C) of the lens (20) varies along the edge face (23) of the lens (20) in accordance with said altitude difference function.

13. A method according to claim 12, wherein the machining of the edge face (23) of the ophthalmic lens (20) is performed by means of a grindwheel (40) that presents a groove (41) for machining the engagement ridge (24), together with two faces (42, 43) on either side of said groove (41) for the purpose of machining the margins (26, 27), and that, during machining, rotates about an axis of rotation (C) that can be oriented relative to the blocking axis (C) of the ophthalmic lens (20), and wherein the variation in the orientation of the profile of the edge face (23) of the ophthalmic lens (20) is obtained by controlling the orientation of the axis of rotation (C) of the grindwheel (40) relative to the blocking axis (C) of the ophthalmic lens (20) while machining of the edge face (23) of the lens (20).

14. A method according to claim 1, wherein the edge face (23) of the lens (20) is machined in such a manner that, at each axial section (Si) of the lens (20), the profiles of the two margins (26, 27) extend generally along straight lines that are substantially parallel to the blocking axis (C) of the ophthalmic lens (20).

15. A method according to Claim 14, wherein the engagement ridge (24) presents a peak (24C) and two sloping flanks (24A, 24B) on either side of the peak (24C), the edge face (23) of the ophthalmic lens (20) is machined by means of a wheel (32) having two working zones (33, 34), each shaped to machine simultaneously one of the sloping flanks (24A, 24B) of the engagement ridge (24) and the adjacent margin (26, 27) of the edge face (23) of the ophthalmic lens (20), and wherein the position of the wheel (32) is controlled so that each of its working zones (33, 34) machines successively and asymmetrically one of the sloping flanks (24A, 24B) of the engagement ridge (24) and the adjacent margin (26, 27), and then the other sloping flanks (24A, 24B) of the engagement ridge (24) and the adjacent margin (26, 27).

16. A method of preparing an ophthalmic lens (20) for mounting in a bezel (11) of a rim (14) of an eyeglass frame (10), the method comprising:
   acquiring the shape of a first longitudinal curve (17) of the bezel (11);
   acquiring a skew angle (Cj) of the profile (11A) of the bezel (11) or the shape of the profile (11A) of the bezel (11) at a plurality of acquired cross-sections (Sj) of the bezel (11); and
   shaping the ophthalmic lens (20) according to the method of claim 1;
   wherein said altitude difference function is deduced from the acquired skew angles (Cj) or from the acquired shapes of the profile (11A) of the bezel (11).

17. A method according to claim 16, wherein, in order to acquire the shape of the first longitudinal curve (17) of the bezel (11), a mechanical feeler (8) is used to read the shape of a bottom edge (12) of the bezel (11), either continuously or discretely.

18. A method according to claim 16, wherein, in order to acquire the shape of the first longitudinal curve (17) of the bezel (11), a record is read automatically from a database register in which each record is associated with a referenced type of frame (10) and contains the shape of the first longitudinal curve (17) of the bezel (11) corresponding to the referenced type of frame.

19. A method according to claim 16, wherein, in order to acquire the shape of the longitudinal curve (17) of the bezel (11) and the shape of the profile (11A) of the bezel (11), a laser imaging is used to acquire the shape of the bezel (11) in three dimensions.

20. A method according to claim 16, wherein, in order to determine the skew angle (Cj) of the profile (11A) of the bezel (11) at said plurality of acquired cross-sections (Sj) of said bezel, a bezel profile is felt at at least two felt cross-sections (Sj) of said bezel, the skew angle (Cj) of the profile (11A) of the bezel (11) is calculated at each of the felt cross-sections (Sj), and the skew angle (Cj) of the profile (11A) of the bezel (11) at each acquired cross-section (Sj) of said plurality of acquired cross-sections is deduced therefrom by interpolation.

21. A method according to claim 20, wherein the position (TETAi) of a section plane (Y) of at least one of the felt cross-sections (Sj) of the bezel (11) is selected by calculation on the basis of the previously acquired shape of the first longitudinal curve (17) of the bezel (11), so that the profile of the bezel in said felt cross-section (Sj) presents a skew angle (Cj) greater than or less than a predefined threshold value.

22. A method according to claim 20, wherein the position (TETAi) of a section plane (Y) of at least one of the felt cross-sections (Sj) of the bezel (11) is predefined or is selected manually by means of a graphics interface including means for pointing to the cross-section (Sj) that is to be felt.

23. A method according to claim 16, wherein, in order to determine the skew angle (Cj) of the profile (11A) of the bezel at said plurality of acquired cross-sections (Sj) of the bezel (11), in addition to acquiring the shape of the first longitudinal curve (17) of the bezel (11), the shape is also acquired of at least one second longitudinal curve (18, 19) of the bezel (11), said curve being offset relative to the first longitudinal curve (17), and the relative positions of the first and second longitudinal curves (17, 18) are determined.

24. A method according to claim 23, wherein, the shapes of the first and second longitudinal curves (17, 18) are acquired by sliding a feeler (8) along the bezel (11), each of the first and second longitudinal curves (17, 18) possessing three shape parameters (R, TETA, Z) corresponding to three dimensions in space, two of these shape parameters of the second longitudinal curve (18) being determined as a function of the corresponding parameters of the first longitudinal curve (17), and the third shape parameter being sensed while reading the second longitudinal curve (18).

25. A method according to claim 24, wherein one of the degrees of freedom (R, Z) of the feeler (8), the degree of freedom enabling the feeler to read said third shape parameter of the first and second longitudinal curves (17, 18), is controlled with bias to ensure that the feeler (8) remains in contact with the bezel (11).

26. A method according to claim 23, wherein, in addition to acquiring the shape of the first longitudinal curve (17) and the shape of the second longitudinal curve (18), the shape of a third longitudinal curve (19) of the bezel (11) is also acquired, and the skew angle (Cj) of the profile (11A) of the bezel (11) is deduced at each section of the plurality of acquired cross-sections (Sj) of the bezel (11) as a function solely of the relative positions of the traces ($P_1j$, $P_2j$, $P_3j$) of the first, second, and third longitudinal curves (17, 18, 19) in said section.

\* \* \* \* \*

UNITED STATES PATENT AND TRADEMARK OFFICE
CERTIFICATE OF CORRECTION

PATENT NO. : 8,133,095 B2
APPLICATION NO. : 12/444997
DATED : March 13, 2012
INVENTOR(S) : Cedric Lemaire et al.

Page 1 of 1

It is certified that error appears in the above-identified patent and that said Letters Patent is hereby corrected as shown below:

In column 3, line 44, please insert before "at least" -- at --

In column 3, line 65, please insert before "at least" -- at --

In column 17, line 37, please amend "Z" to read -- z --

In column 18, lines 60-63, please amend matrix M to read

-- M = [cos p, sin p]
     [-sin p, cos p]     with p = Cn – Cm --

Signed and Sealed this
Fifteenth Day of May, 2012

David J. Kappos
*Director of the United States Patent and Trademark Office*